(12) United States Patent
Morita et al.

(10) Patent No.: US 7,240,234 B2
(45) Date of Patent: Jul. 3, 2007

(54) STORAGE DEVICE FOR MONITORING THE STATUS OF HOST DEVICES AND DYNAMICALLY CONTROLLING PRIORITIES OF THE HOST DEVICES BASED ON THE STATUS

(75) Inventors: Hidehiro Morita, Odawara (JP); Koichi Okada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 432 days.

(21) Appl. No.: 10/868,917

(22) Filed: Jun. 17, 2004

(65) Prior Publication Data

US 2005/0228947 A1    Oct. 13, 2005

(30) Foreign Application Priority Data

Apr. 7, 2004    (JP) ............................. 2004-113419

(51) Int. Cl.
    G06F 11/00    (2006.01)
(52) U.S. Cl. ............................... 714/4; 714/10; 710/36
(58) Field of Classification Search ...................... 714/3
    See application file for complete search history.

(56) References Cited

U.S. PATENT DOCUMENTS

| | | | |
|---|---|---|---|
| 5,872,906 A | | 2/1999 | Morita et al. |
| 6,292,905 B1 | | 9/2001 | Wallach et al. |
| 6,526,521 B1 | * | 2/2003 | Lim ............................. 714/4 |
| 6,625,750 B1 | | 9/2003 | Duso et al. |
| 6,799,228 B2 | * | 9/2004 | Mamiya et al. ............... 710/40 |
| 6,904,469 B2 | * | 6/2005 | Ido et al. ........................ 710/6 |
| 6,981,170 B2 | * | 12/2005 | Nakagawa et al. ............. 714/4 |
| 7,100,074 B2 | * | 8/2006 | Watanabe et al. ............... 714/9 |
| 2004/0148443 A1 | | 7/2004 | Achiwa |
| 2005/0010838 A1 | * | 1/2005 | Davies et al. ............... 714/100 |
| 2005/0015657 A1 | | 1/2005 | Sugiura et al. |
| 2005/0138517 A1 | | 6/2005 | Monitzer |
| 2006/0075156 A1 | * | 4/2006 | Okaki et al. ................... 710/17 |

FOREIGN PATENT DOCUMENTS

| | | |
|---|---|---|
| JP | 2000215076 | 8/2000 |
| JP | 2001222382 | 8/2001 |

* cited by examiner

*Primary Examiner*—Robert Beausoliel
*Assistant Examiner*—Philip Guyton
(74) *Attorney, Agent, or Firm*—Mattingly, Stanger, Malur & Brundidge, P.C.

(57) ABSTRACT

The present invention observes the status on the server side from the storage device side, and controls the processing priority in accordance with the server status.

The storage device 2 is utilized by numerous servers 1A through 1C. The server 1A and server 1B form a failover cluster. The status detection part 5 judges whether or not an event observed from the server 1A or 1B corresponds to a specified event (link down or the like). In cases where such a specified event is observed, the status detection part 5 detects the occurrence of failover. In accordance with the detection of the occurrence of failover, the priority control part 6 sets the processing priority of the failover destination server at a priority that is higher than the ordinary processing priority. When the preset failover time has elapsed, the priority during failover is returned to the ordinary priority.

10 Claims, 20 Drawing Sheets

ORDINARY OPERATION

PLANNED STOP OR OCCURRENCE OF FAILURE

FAILOVER

TA1 — SERVER MANAGEMENT TABLE

| SERVER ID | WWN | NORMAL PRIORITY RANKING | CURRENT RANKING | PRIORITY RANKING DURING FAILOVER | FAILOVER FLAG |
|---|---|---|---|---|---|
| N1 | aaaa... | 5 | 1 | 1 | ON |
| N2 | bbbb... | 5 | 1 | 1 | ON |
| N3 | cccc... | 5 | 5 | 5 | OFF |
| N4 | dddd... | 5 | 7 | 7 | OFF |
| ⋮ | ⋮ | ⋮ | ⋮ | ⋮ | ⋮ |

TA2 — CLUSTER MANAGEMENT TABLE

| CLUSTER ID | SERVER ID | OBJECT OF FAILOVER MONITORING | | FAILOVER TIME |
|---|---|---|---|---|
| | | DISK # | OPERATING PATTERN ID | |
| C1 | N1,N2 | LU#n | PA1, PA2, PB1, PB2 PB3, PB4 | 600 SECONDS |
| ⋮ | ⋮ | ⋮ | ⋮ | ⋮ |

TA3 — FAILOVER DETECTION PATTERN TABLE

| OPERATING PATTERN ID | FAILOVER DETECTION PATTERN | FAILOVER ADVANCE COUNTERMEASURE PROCESSING |
|---|---|---|
| PA1 | FIBER CHANNEL LINK DOWN | PRIORITY RANKING OF SERVER FORMING PAIR WITH FAILURE GENERATION SOURCE SERVER RAISED |
| PA2 | HOST NON-RESPONSE | PRIORITY RANKING OF SERVER FORMING PAIR WITH NON-RESPONDING SERVER RAISED |
| PB1 | RELEASE COMMAND RECEIVED | PRIORITY RANKING OF SERVER FORMING PAIR WITH COMMAND ISSUING SOURCE SERVER RAISED |
| PB2 | RESET COMMAND RECEIVED | PRIORITY RANKING OF COMMAND ISSUING SOURCE SERVER RAISED |
| PB3 | RESERVE COMMAND RECEIVED | PRIORITY RANKING OF COMMAND ISSUING SOURCE SERVER RAISED |
| PB4 | WRITE COMMAND FOR SPECIFIED ADDRESS RANGE RECEIVED | PRIORITY RANKING OF COMMAND ISSUING SOURCE SERVER RAISED |

SERVER MANAGEMENT TABLE TA1a

| SERVER ID | WWN | NORMAL PRIORITY RANKING | CURRENT RANKING | PRIORITY RANKING DURING FAILOVER | FAILOVER FLAG | PRIORITY RANKING DURING OVERLOAD | OVERLOAD COUNTER-MEASURE FLAG |
|---|---|---|---|---|---|---|---|
| N1 | aaaa... | 5 | 1 | 1 | OFF | 1 | ON |
| N2 | bbbb... | 5 | 5 | 1 | OFF | 1 | OFF |
| N3 | cccc... | 5 | 5 | 5 | OFF | 5 | OFF |
| N4 | dddd... | 5 | 7 | 7 | OFF | 7 | OFF |
| ... | ... | ... | ... | ... | ... | ... | ... |

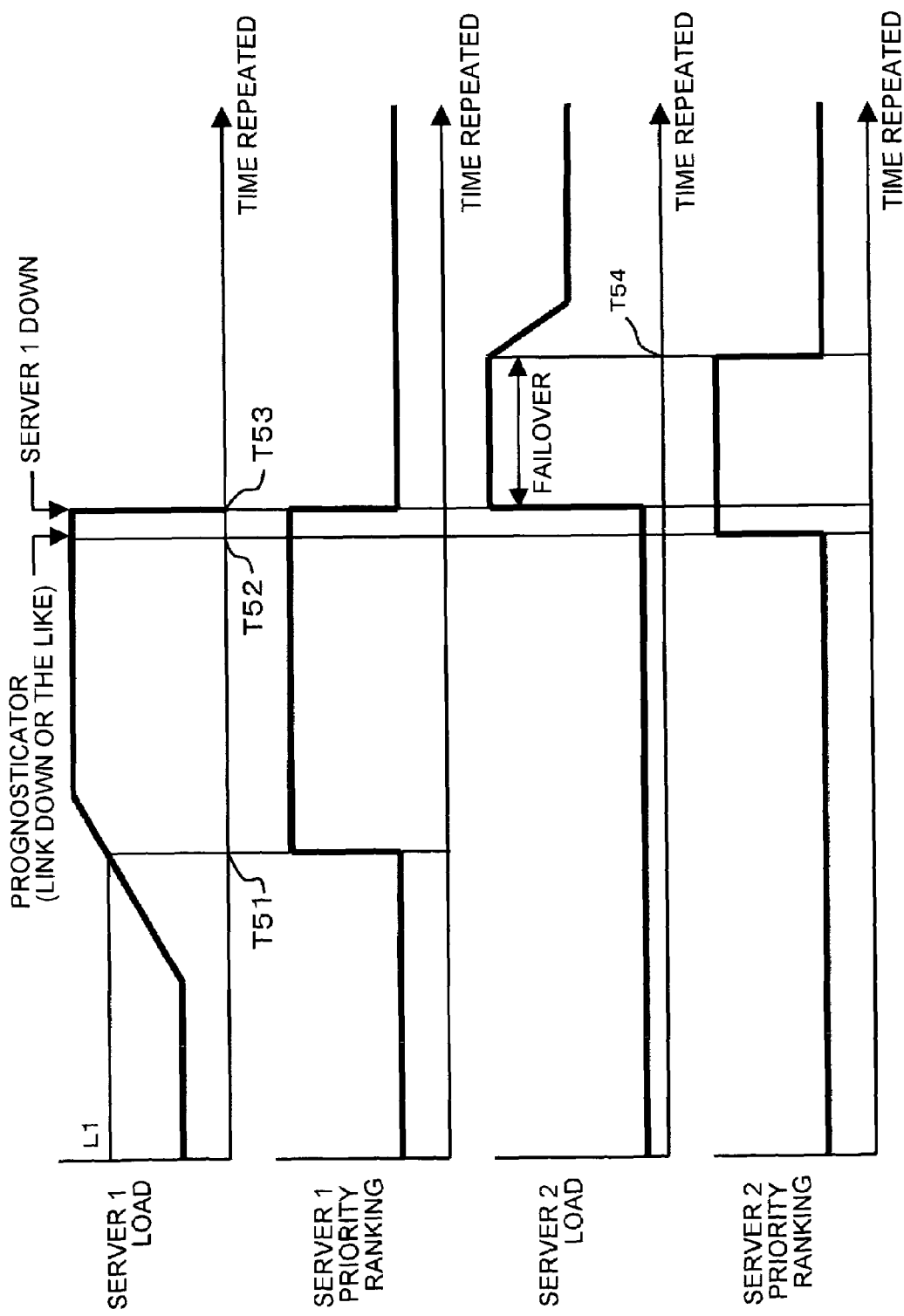

STORAGE DEVICE FOR MONITORING THE STATUS OF HOST DEVICES AND DYNAMICALLY CONTROLLING PRIORITIES OF THE HOST DEVICES BASED ON THE STATUS

CROSS-REFERENCE TO RELATED APPLICATIONS

This application relates to and claims priority from Japanese Patent Application No. 2004-113419 filed on Apr. 7, 2004, the entire disclosure of which is incorporated herein by reference.

BACKGROUND OF THE INVENTION

1. Field of the Invention

The present invention relates to a storage device.

2. Description of the Related Art

Storage devices are also called (for example) disk array devices or the like, and are constructed by disposing numerous disk drives in the form of an array. For example, storage devices provide memory regions on the basis of a RAID (redundant array of independent inexpensive disks). Logical volumes (logical devices) which are logical memory regions are formed on the physical memory regions of each disk drive. For example, a host computer such as a server or the like can read and write desired data by issuing write commands or read commands that have a specified format to the storage device.

A plurality of servers can form a single aggregate, and can share one or a plurality of logical volumes of the storage device. Such a system in which a plurality of servers are mutually linked is called a cluster system or the like. For example, a failover system is known as one type of cluster system. A failover system is a system which is devised so that when one server stops, another server takes over the business application service of this stopped server (Japanese Patent Application Laid-Open No. 2000-215076). As a result, in a failover system, continuity of service is ensured for client computers.

Furthermore, disk devices are also known which are devised so that in cases where a plurality of servers share a disk device, important services can be preferentially processed by changing the queue execution order in accordance with the importance of the service (Japanese Patent Application Laid-Open No. 2001-222382).

In the conventional technique described in the former patent reference, information relating to the failover destination is respectively held in each node (server), so that the time required for the starting of failover can be shortened, and the failover time can be shortened. However, in this conventional technique, the time is shortened only on the server side; no consideration is given to shortening the time on the side of the storage device.

In the case of failover, for example, various types of processing are performed, such as processing that unmounts the file system from the server that has gone down, processing that mounts the unmounted file system in the failover destination server, processing that obtains a match in data between the failover source server and failover destination server, processing that restarts the application program in the failover destination server and the like.

In order to perform these types of processing, the failover destination server frequently accesses the storage device and performs the reading and writing of data during failover. Accordingly, even if an attempt is made to shorten the failover time on the server side, the failover time cannot be shortened unless the response characteristics of the storage device are improved. The reason for this is that the response characteristics of the storage device during failover constitute a bottleneck.

Especially in recent years, the memory capacity of storage devices has increased, and the processing performance has also improved. Since systems in which a high-performance, high-capacity storage device is used by a small number of servers are uneconomical, it is more common for a single storage device to be shared by a large number of servers.

In cases where a storage device is utilized by only a single failover cluster, this storage device can give close attention to the processing of input-output requests that accompany failover. However, under conditions in which a storage device is shared by numerous clusters or servers, the storage device must perform the processing of input-output requests from the other servers in addition to the processing of input-output requests that accompany failover. Accordingly, the response to input-output requests that accompany failover is slow, so that there is a possibility that the failover time will be prolonged.

In the latter patent reference, the order of queue execution is switched according to a preset priority for each memory access. However, this conventional technique does not give any consideration to a failover cluster system; furthermore, the priority of memory access is not dynamically altered in accordance with the conditions of the server.

SUMMARY OF THE INVENTION

It is an object of the present invention to provide a storage device which is devised so that the priority with which input-output requests are processed can be dynamically altered in accordance with the conditions of the host device. Furthermore, it is another object of the present invention to provide a storage device which is devised so that in cases where an abnormal condition of one host device is detected, this abnormal condition can be quickly handled by raising the processing priority for another host device that forms a pair with this host device. Furthermore, it is another object of the present invention to provide a storage device which is devised so that the occurrence of failure caused by an overload can be suppressed by raising the processing priority for a host device that is in an overload state. Furthermore, it is another object of the present invention to provide a storage device which is devised so that the occurrence of a failure in a host device in an overload state is suppressed, and so that even in cases where a failure does occur, this failure can be quickly handled by raising in advance the processing priority for another host device that forms a pair with this host device. Furthermore, it is another object of the present invention to provide a storage device in which failover can be quickly ended by inferring failover between host devices in advance, and raising the processing priority for the failover destination host device beforehand. Other objects of the present invention will become clear from the description of embodiments that follows.

BRIEF DESCRIPTION OF THE DRAWINGS

FIG. 7 is an explanatory diagram which shows one example of the management table;

FIG. 11 is an explanatory diagram which shows the progression of failover due to link down or the like;

FIG. 12 is an explanatory diagram which shows the progression of failover due to a planned stop or the like;

FIG. 13 is an explanatory diagram which shows the progression of failover that is not accompanied by link down or the like;

FIG. 18 is an explanatory diagram which shows the construction of the server management table;

FIG. 20 is a timing chart which shows how the priority ranking of the failover destination server is set at a higher value after the priority ranking of the future failover source server has been set at a higher value.

DESCRIPTION OF THE PREFERRED EMBODIMENTS

Figure 1:
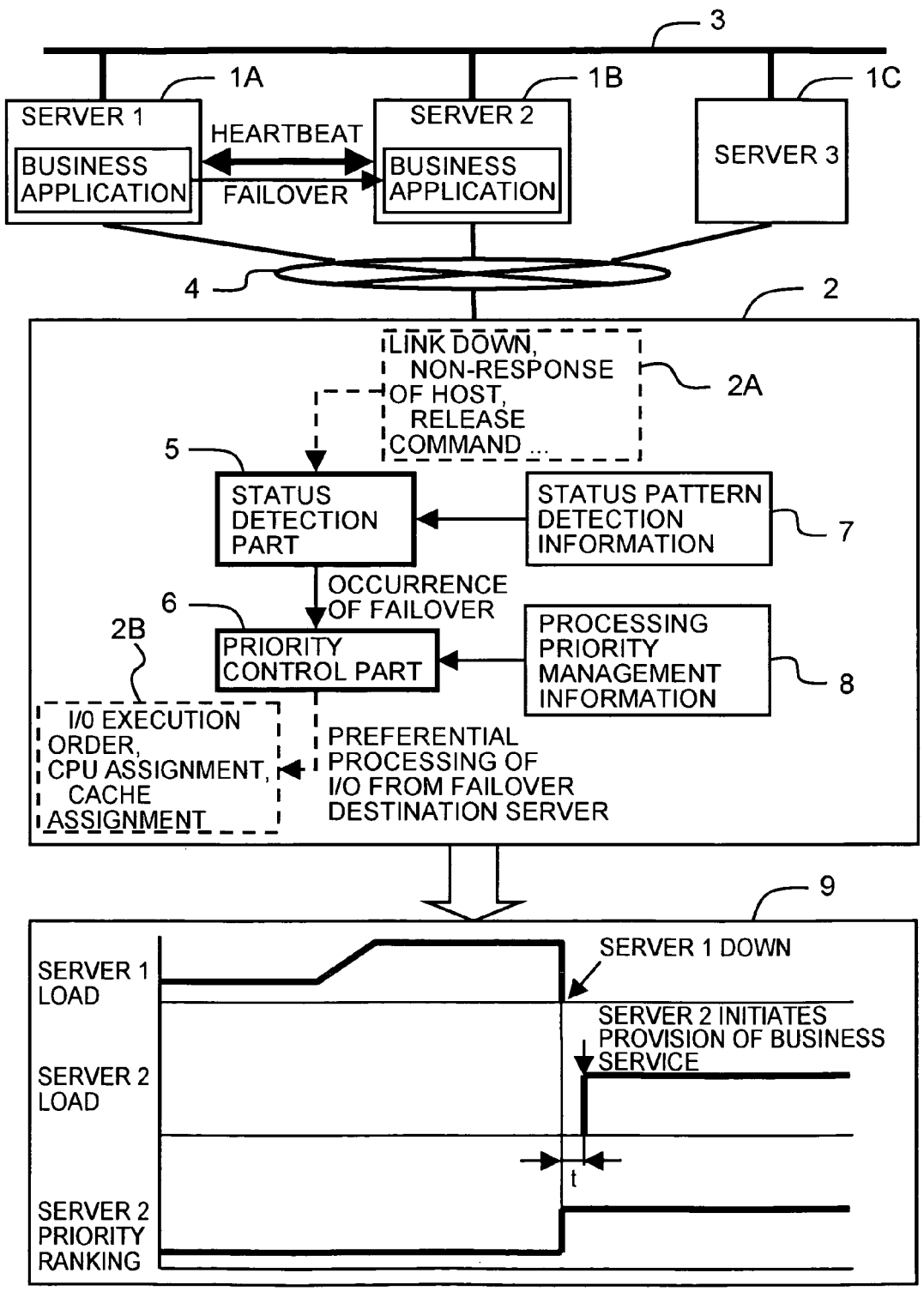
FIG. 1 is an explanatory diagram showing the schematic concept of an embodiment of the present invention.

In order to solve the abovementioned problems, the present invention is devised so that the status of the respective host devices is recognized on the side of the storage device, and so that the processing priorities for the respective host devices can be dynamically controlled on the basis of this recognition. The storage device according to the present invention comprises first interface control parts which respectively control the exchange of data with a plurality of host devices, slave interface controls part which respectively control the exchange of data with a plurality of memory devices, and a memory part that is shared by the first interface control parts and second interface control parts. Furthermore, this storage device comprises a status detection part which respectively detects the status of the respective host devices via the first interface control parts, and a priority control part which respectively controls the processing priority for the processing of input-output requests from the respective host devices in accordance with the detected status of the respective host devices.

For instance, servers, personal computers, main frame computers and the like may be cited as examples of host devices. Furthermore, for instance, hard disk drives, semiconductor memories, optical disk drives and the like may be cited as examples of memory devices. Moreover, for instance, cache memories, control memories and the like may be cited as examples of memory parts. Furthermore, for example, a portion of the memory device may be used as the memory part. The status detection part respectively detects the status in which the respective host devices are placed via the first interface control parts. For example, the status detection part can detect the status of the respective host devices on the basis of the types of commands or objects of processing issued from the host devices, or the presence or absence of responses from the host devices. The priority control part controls the processing priority in accordance with the status of the respective host devices. The processing priority refers to the priority ranking for the processing of input-output requests from the host devices. As the processing priority is higher, the input-output request in question is preferentially processed over other requests. For example, methods for the preferential processing of input-output requests with a high processing priority include a method in which the queue execution order is switched, a method in which more computer resources (CPU utilization rate, amount of memory used or the like) are assigned to input-output requests with a higher processing priority, and the like.

The respective host devices may form clusters, and the priority control part may perform control so that in cases where the detected status of a host device indicates that an abnormal condition has occurred, the processing priority of the host device that forms a pair with the host device in which this abnormal condition has occurred is raised. Specifically, for example, in the case of a failover cluster, when failover occurs, the processing priority of the failover destination host device is raised, so that the failover time is shortened.

The priority control part can perform control so that in cases where the detected status of a host device indicates an overload state, the processing priority of the host device in which this overload state has occurred is raised. As a result, the system failure of the host device due to an overload can be prevented, and the occurrence of failover can be prevented or delayed.

The priority control part can also perform control so that in cases where the detected status of a host device indicates an overload state, the processing priority of the host device in which this overload state has occurred is raised, and can perform control so that in cases where the detected status of a host device indicates the occurrence of an abnormal condition, the processing priority of a host device that forms a pair with the host device in which this abnormal condition has occurred is raised. As a result, system failure due to an overload can be prevented or delayed, and even if the host device should go down due to an overload, the failover can be quickly ended.

In cases where a specified failure occurs in one of the host devices forming a pair, the priority control part can also raise the processing priority of the other host device forming this pair prior to the detection of the occurrence of failure by this other host device. For example, in the case of a failover cluster, the priority control part can raise the processing priority of the failover destination host device in advance before the failover destination host device decides to initiate failover. For example, such an early inference of failover can be made in cases where channel path failure with the failover source device occurs, in cases where no response comes back from the failover source host device within a specified period of time, in cases where the failover source host device issues a specified command (a command releasing exclusive control of the shared volume or the like) or the like.

A priority management table in which a plurality of status patterns and processing priorities for each of these status patterns are caused to correspond may be stored beforehand in the memory part. Furthermore, the priority control part can determine the processing priority for the respective host devices on the basis of the detected status of the respective host devices by referring to this priority management table.

Specified input-output requests that are respectively issued by the respective host devices can be defined in the respective status patterns on the basis of a plurality of specified statuses in which the respective host devices can be placed. The status detection part can respectively detect the status of each host device by comparing the input-output requests received by the first interface control parts from the respective host devices with specified input-output requests.

The priority control part may perform control so that altered processing priorities are returned to the original processing priorities when specified alteration termination conditions are met. As a result, in cases where the handling of failure or the like is completed, the computer resources of the storage device can be assigned to the input-output request processing of other host devices, so that the storage device can be efficiently used.

The priority control part can also perform control so that in cases where the processing of an input-output request from a host device is delayed beyond a specified value, the processing priority is raised in steps, and so that in cases where the processing of an input-output request from a host device is advanced to a point in time earlier than a specified value, the processing priority is lowered in steps. Furthermore, for example, in cases where a status that is not registered beforehand in the priority management table is generated in a host device, the priority control part can also alter the processing priority in steps while taking into account the response time to this host device.

According to another aspect of the present invention, the present invention is a method for controlling the processing priority of a storage device comprising first interface control parts which respectively control the exchange of data with a plurality of host devices, second interface control parts which respectively control the exchange of data with a plurality of memory devices, and a memory part that is shared by the first interface control parts and second interface control parts, wherein this method comprises the steps of respectively detecting the status of the abovementioned respective host devices via the abovementioned first interface control parts, and respectively controlling the processing priority used to process input-output requests from the abovementioned respective host devices in accordance with the detected status of the abovementioned respective host devices.

An embodiment of the present invention will be described below with reference to the attached figures. The storage device of the present embodiment comprises channel adapters which respectively control the exchange of data with a plurality of host devices that constitute a failover cluster, disk adapters which respectively control the exchange of data with a plurality of disk media, and a memory which is shared by the channel adapters and disk adapters. Furthermore, this storage device comprises a priority management table which is stored in the memory, and in which specified input-output requests respectively originating in a plurality of specified statuses in which the respective host devices may be placed and processing priorities for each of these specified input-output requests are caused to correspond beforehand, a status detection part which respectively detects whether or not the respective host devices are in a specified status by comparing the input-output requests received from the respective host devices via the channel adapters with the respective specified corresponding input-output requests in the priority management table, a priority control part which is devised so that in cases where a host device with a specified status is detected, this priority control part raises the processing priority of the host device that is set as the failover destination of this host device to a priority that is higher than the ordinary processing priority, and which lowers the processing priority of the host device that is set as the failover destination to the ordinary processing priority when failover is completed, and an alteration instruction part which is used to alter the content of the priority management table.

FIG. 1 is an explanatory diagram which shows the overall schematic concept of the present embodiment. A plurality of servers 1A through 1C share a storage device 2. In the figures, the server 1A is indicated as the "server 1", the server 1B is indicated as the "server 2", and the server 1C is indicated as the "server 3". These respective servers 1A through 1C are connected to each other via a communications network 3 such as a LAN (local area network) or the like. Furthermore, the respective servers 1A through 1C are also connected to a plurality of client computers (not shown in the figures) via the communications network 3. Moreover, the respective servers 1A through 1C are respectively connected to the storage device 2 via a communications network 4 such as a SAN (storage area network) or the like.

Here, the servers 1A and 1B form a failover cluster, and are each set as the failover destination of the other. By performing heartbeat communications, the respective servers 1A and 1B each occasionally monitor whether or not the system of the other server has gone down. If one server 1A goes down because of a failure or the like, the business application service provided by this server 1A is taken over by the other server 1B. Conversely, in cases where the other server 1B goes down, the business application service provided by this other server 1B is taken over by the first server 1A.

The storage device 2 respectively provides logical volumes (logical memory devices) to the respective servers 1A through 1C. The respective servers 1A and 1B that form a failover cluster share a common logical volume. The storage device 2 respectively detects the status of the respective servers 1A through 1C on the basis of responses from the respective serves 1A through 1C or the like.

To describe this system with a focus on the servers 1A and 1B that form a failover cluster, the statuses in which the respective servers 1A and 1B are placed can be inferentially detected on the basis of a specified event 2A that is observed from the respective servers 1A and 1B. For example, this specified event 2A may include cases in which the link between the server 1A or 1B and the storage device 2 has gone down, cases of non-response in which a specified response is not received from the server 1A or 1B, cases in which a specified command (release command, reset command or the like is issued by the server 1A or 1B, or the like. In cases where such a specified event 2A is observed, the occurrence of failover may be predicted. A correspondence of such specified events 2A as prognosticators of the occurrence of failover is established beforehand in status pattern detection information 7.

The status detection part 5 judges whether or not the observation results for the respective servers 1A and 1B correspond to the specified event 2A. In cases where the observation results correspond to such a specified event 2A, the status detection part detects the occurrence of failover, and notifies the priority control part 6 of this. By referring to processing priority management information, the priority control part 6 sets the processing priority of the server 1A or server 1B at a priority that is higher than the ordinary processing priority. How the processing priority of each server is to be adjusted is defined beforehand in the processing priority management information 8 for each observed event.

For example, in a case where it is predicted that failover from the server 1A to the server 1B will occur, the priority control part 6 sets the processing priority of the server 1B at a higher priority. Conversely, in a case where it is predicted that failover from the server 1B to the server 1A will occur, the priority control part 6 sets the processing priority of the server 1A at a higher priority. For example, for the server whose processing priority is raised to a higher priority, a specified priority processing operation 2B such as raising the execution priority of input-output requests (I/O requests), preferentially assigning computer resources such as the CPU, memory or the like to the processing of input-output requests from this server or the like is performed. As a result, the input-output requests from such a server that has a higher processing priority are preferentially processed over input-output requests from other servers.

A case in which (for example) the "server 1" (server 1A) has gone down because of some type of failure will be considered as indicated in the timing chart 9 shown at the bottom of FIG. 1. In some cases, this failure of the server 1A can be predicted in advance by the storage device 2. In cases where a specified event that is observed prior to the failure of the server 1A is defined in advance in the status pattern detection information 7, the failure of the server 1A can be inferred in advance. When the failure of the server 1A is inferred in advance, the storage device 2 sets the processing priority of the "server 2" (server 1B) at a higher priority beforehand, prior to the initiation of failover by the server 1B, i. e., prior to the recognition of the failure of the server 1A by the server 1B. As a result, the input-output requests from the server 1B are preferentially processed, so that the respective processing operations involved in failover can be quickly completed. Accordingly, the failover time t can be shortened.

Concrete embodiments of the present invention will be described below. First, an example of the construction of the storage device 2 will be described with reference to FIGS. 2 and 3. Nest, the method used to observe the status on the server side and dynamically control the processing priority will be described with reference to FIG. 3 and subsequent figures.

1. First Embodiment

Figure 2:
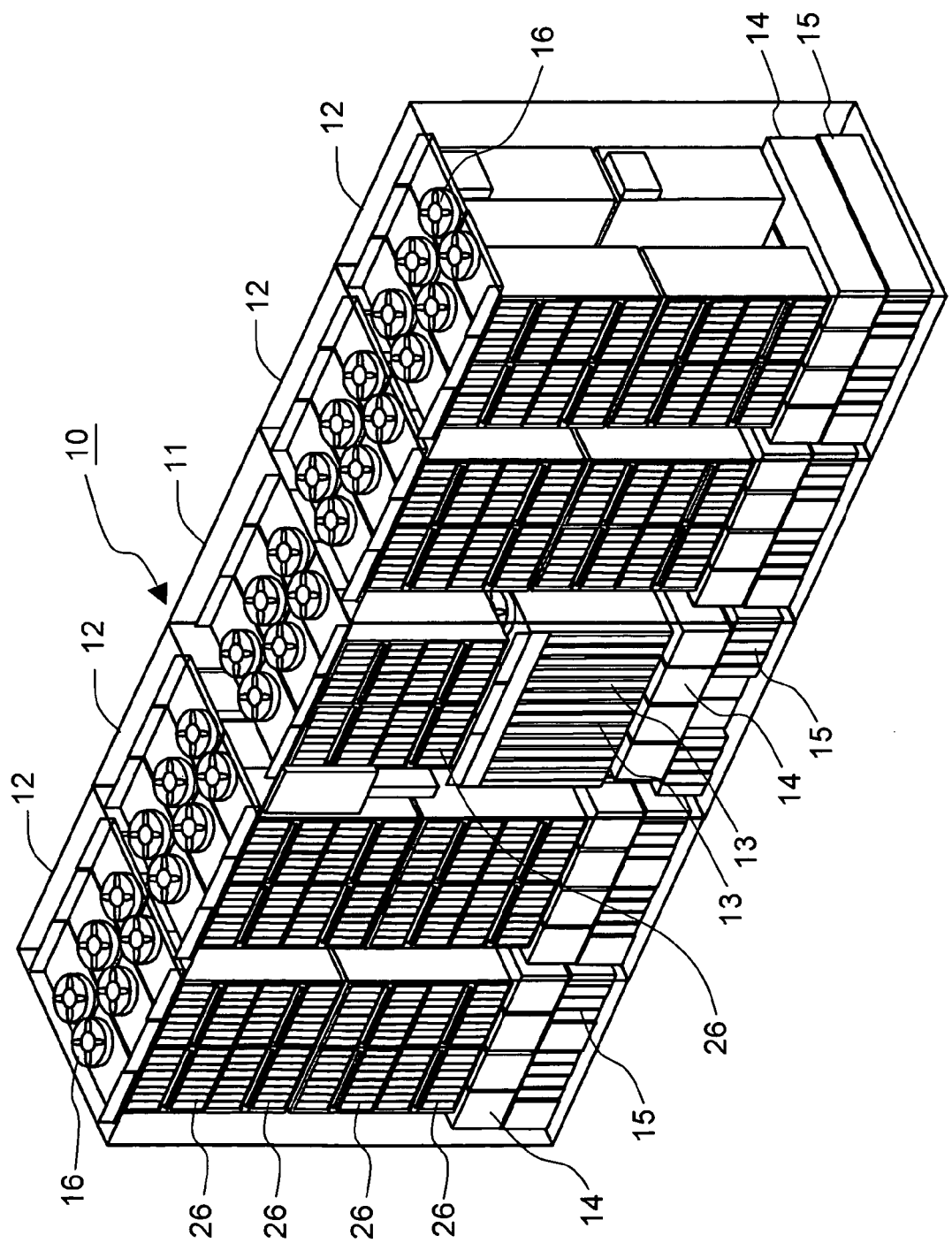
FIG. 2 is a perspective view which shows the external appearance of the storage device.

FIG. 2 is a schematic perspective view which shows the external appearance and construction of a storage device 10. For example, this storage device 10 can be constructed from a basic housing 11 and a plurality of additional housings 12.

The basic housing 11 is the minimum constituent unit of the storage device 10, and has both a memory function and a control function. The additional housing 12 are options for the storage device 10, and are controlled by the control function of the basic housing 11. For example, a maximum of four additional housing 12 can be connected to the basic housing 11.

A plurality of control packages 13, a plurality of power supply units 14, a plurality of battery units 15 and a plurality of disk drives 26 are respectively disposed in a detachable manner in the basic housing 11. A plurality of disk drives 26, a plurality of power supply units 14 and a plurality of battery units 15 are respectively disposed in a detachable manner in each of the additional housings 12. Furthermore, a plurality of cooling fans 16 are also respectively disposed in the basic housing 11 and in each of the additional housings 12.

The control packages 13 are modules which are used for the respective realization of channel adapters (hereafter abbreviated to "CHA") 21, disk adapters (hereafter abbreviated to "DKA") 22, cache memories 23 and the like (described later). Specifically, a plurality of CHA packages, a plurality of DKA packages and one or more memory packages are respectively disposed in a detachable manner in the basic housing 11, and these packages can be replaced in package units.

Figure 3:
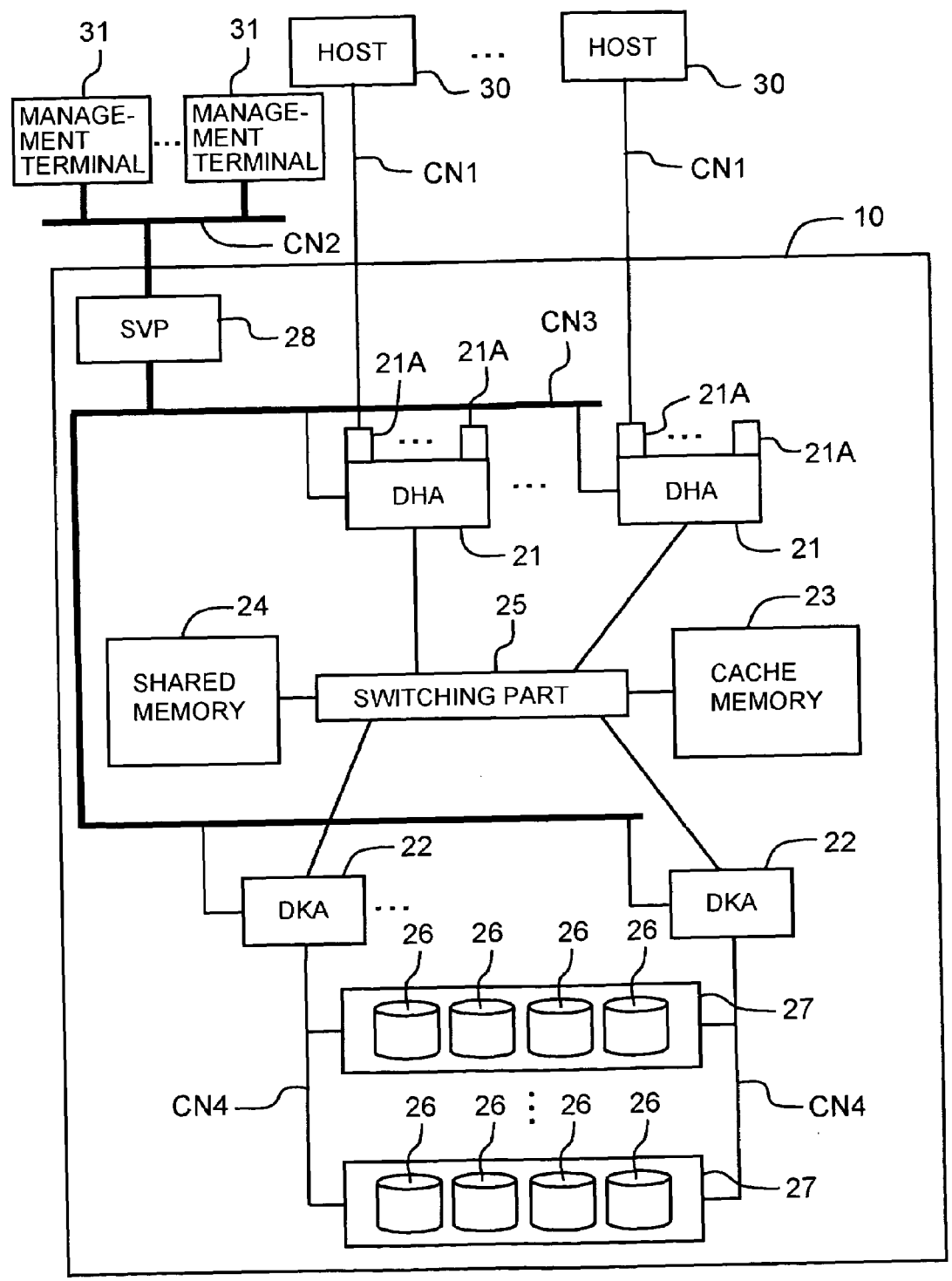
FIG. 3 is a functional block diagram of the storage device.

FIG. 3 is a block diagram which shows an overall outline of the storage device 10. The storage device 10 is respectively connected to a plurality of host computers 30 via a communications network CN1 so that two-way communications are possible.

For example, the communications network CN1 is a LAN, SAN, the internet, a dedicated circuit or the like. In cases where a LAN is used, data transfer between the host computers 30 and the storage device 10 is performed according to TCP/IP. In cases where a SAN is used, the host computers 30 and storage device 10 perform data transfer according to a fiber channel protocol. Furthermore, in cases where the host computers 30 are main frame computers, data transfer is performed (for example) according to a communications protocol such as FICON (Fiber Connection: registered trademark), ESCON (Enterprise System Connection: registered trademark), ACONARC (Advanced Connection Architecture: registered trademark), FIBARC (Fiber Connection Architecture: registered trademark) or the like.

For example, each host computer 30 is realized as a server, personal computer, workstation, main frame computer or the like. For example, the respective host computers 30 are connected to a plurality of client terminals positioned outside the figures via a separate communications network. For example, the respective host computers 30 provide services to the respective client terminals by writing data into the storage device 10 in accordance with requests from the respective client terminals.

The respective CHAs 21 control the transfer of data between with the respective host computers 30, and comprise communications ports 21A. For example, 32 CHAs 21 may be installed in the storage device 10. The CHAs 21 are prepared in accordance with the type of the host computers 30 (for example, as open type CHAs, main frame type CHAs or the like). The status of the respective host computers 30 can be observed via the respective CHAs 21.

The respective CHAs 21 receive data and commands requesting the reading or writing of data from the respectively connected host computers 30, and operate in accordance with the commands received from the host computers 30.

To describe this in advance, including the operation of the DKAs 22, when the CHAs 21 receive read commands from the host computers 30, these read commands are stored in a shared memory 24. The DKAs 22 occasionally refer to the shared memory 24, and if unprocessed read commands are discovered, the DKAs 22 read out the data from the disk drives 26, and store this data in the cache memory 23. The CHAs 21 read out data that has been transferred to the cache memory 23, and transmit this data to the host computers 30.

Meanwhile, when the CHAs 21 receive write commands from the host computers 30, the CHAs 21 store these write commands in the shared memory 24. Furthermore, the CHAs 21 store the received data (user data) in the cache memory 23. After the CHAs 21 have stored this data in the cache memory 23, the CHAs 21 report the completion of writing to the host computers 30. The DKAs 22 read out the data stored in the cache memory 23 and store this data in specified disk drives 26 in accordance with the write commands stored in the shared memory 24.

A plurality of DKAs 22, e. g., four or eight DKAs, can be disposed in the storage device 10. The respective DKAs 22 respectively control data communications with the respective disk drives 26. For example, the respective DKAs 22 and the respective disk drives 26 are connected via a communications network CN4 such as a SAN or the like, and perform data transfer in block units according to a fiber channel protocol. The respective DKAs 22 occasionally monitor the status of the disk drives 26, and these monitoring results are transmitted to an SVP 28 via an internal network CN3.

For example, the respective CHAs 21 and the respective DKAs 22 respectively comprise a printed circuit board on which a processor, memory and the like are mounted, and a control program stored in the memory (neither of these parts is shown in the figures). Respective specified functions are realized by the cooperative action of this hardware and software.

For example, the cache memory 23 stores user data and the like. For instance, the cache memory 23 is constructed from a nonvolatile memory.

For example, the shared memory (or control memory) 24 is constructed from a nonvolatile memory. For instance, control information, management information and the like are stored in the shared memory 24. Information such as this control information and the like can be multiplex-managed by a plurality of shared memories 24. A plurality of both shared memories 24 and cache memories 23 can be installed. Furthermore, the cache memory 23 and shared memory 24 can also be mounted in a mixed manner on the same memory board. Alternatively, a portion of the memory can be used as a cache region, and another portion of the memory can be used as a control region.

The switching part 25 respectively connects the respective CHAs 21, the respective DKAs 22, the cache memory 23 and the shared memory 24. As a result, all of the CHAs 21 and DKAs 22 can access the cache memory 23 and shared memory 24. For example, the switching part 25 can be constructed as an ultra-high speed cross bar switch or the like.

The storage device 10 can mount numerous disk drives 26. For example, the respective disk drives 26 can be realized as hard disk drives (HDD), semiconductor memory devices or the like.

The disk drives 26 are physical memory devices. For example, RAID groups 27 which are virtual logical regions are constructed in physical memory regions provided by the disk drives 26 with four of these disk drives constituting one set (although this also varies according to the RAID construction and the like). Furthermore, one or more virtual logical devices (LU: logical units) can be disposed in each RAID group 27. These logical devices are called logical volumes.

Furthermore, it is not necessary that all of the memory resources used by the storage device 10 be installed inside the storage device 10. The storage device 10 can incorporate and utilize memory resources that are present outside the storage device 10 as though these memory resources were its own memory resources.

The service processor (SVP) 28 respectively connects the respective CHAs 21 and respective DKAs 22 via an internal network CN3 such as a LAN or the like. For example, the SVP 28 can access the shared memory 24 via the CHAs 21. Furthermore, the SVP can be connected to a plurality of management terminals 31 via a communications network CN2 such as a LAN or the like. The SVP 28 collects various types of conditions inside the storage device 10, and provides these conditions to the management terminals 31. Furthermore, the SVP 28 need not be installed inside the housing of the storage device 10; this SVP may also be installed outside the housing.

Figure 4:
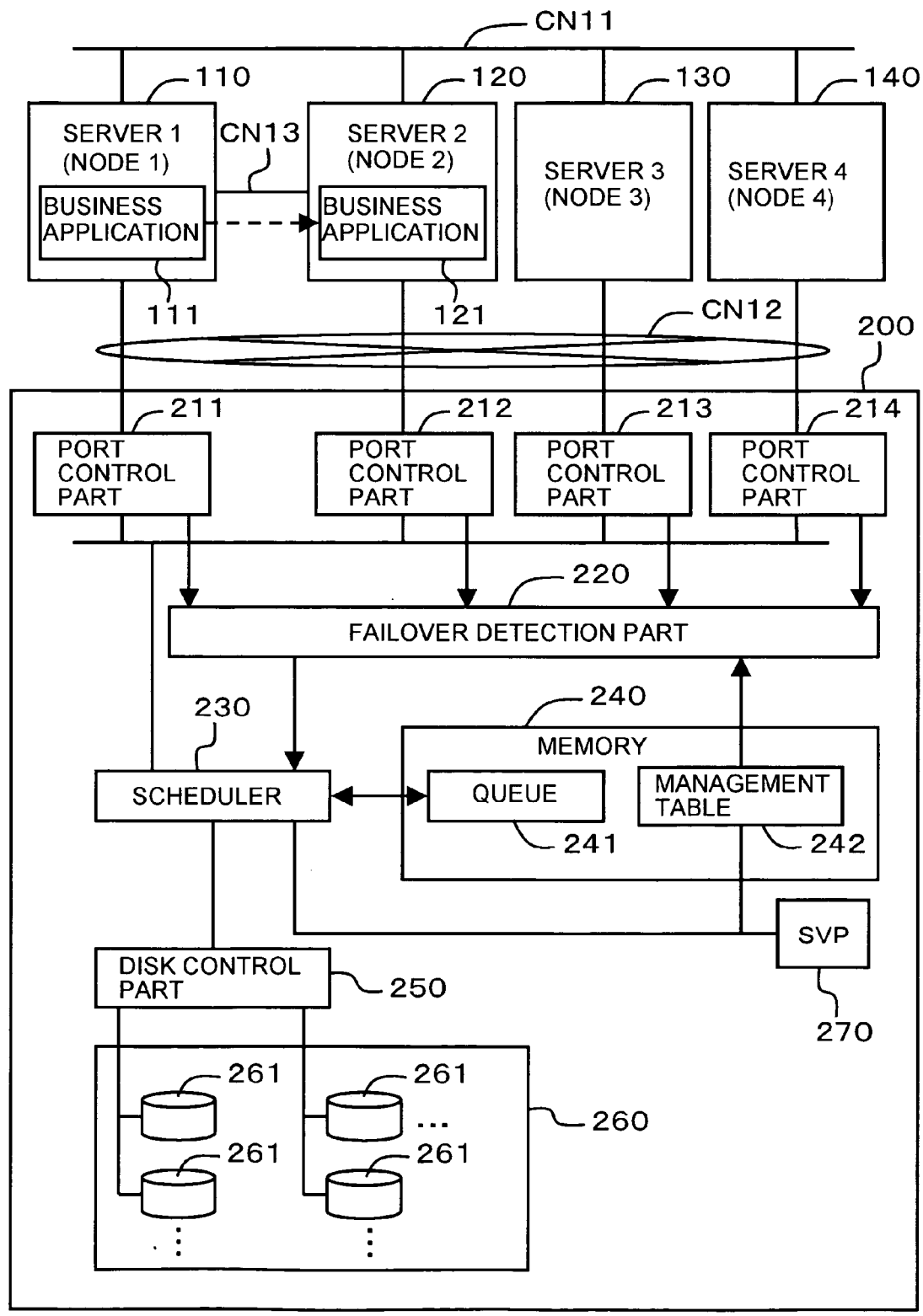
FIG. 4 is a block diagram which shows the overall construction of the storage system.

FIG. 4 is a block diagram which shows the overall construction of a storage system containing the storage device 200. This storage system comprises a plurality of servers 110 through 140, and a storage device 200.

The respective servers 110 through 140 correspond to the host computers 30 sown in FIG. 3. The respective servers 110 through 140 can comprise respective business application programs 111 and 121 (only the servers 110 and 120 are shown in the figures). In the figures, the server 110 is indicated as the "server 1 (node 1)", the server 120 is indicated as the "server 2 (node 2)", the server 130 is indicated as the "server 3 (node 3)", and the server 140 is indicated as the "server 4 (node 4)". For example, the respective servers 110 through 140 are connected to each other via a communications network CN11 such as a LAN or the like. The respective servers 110 through 140 are also connected to client terminals outside the figures via the communications network CN11. Moreover, for example, the respective servers 110 through 140 are also respectively connected to the storage device 200 via a communications network CN12 such as a SAN or the like.

Although this is not shown in the figures, the respective servers 110 through 140 and the storage device 200 can also be connected by the communications network CN11. The respective servers 110 through 140 and the storage device 200 can transmit and receive control information and the like via the communications network CN11. Furthermore, the respective servers 110 through 140 and the storage device 200 can also transmit and receive control information and the like via a communications network CN12 such as a SAN or the like. In this case, block data, control information and the like are transferred via the communications network CN12.

The first server 110 and second server 120 form a failover cluster in which these servers are in a mutual failover relationship. These respective servers 110 and 120 are connected to each other by a dedicated communications network CN13. The respective servers 110 and 120 perform heartbeat communications via this communications network CN13. In cases where the heartbeat communications are interrupted, the respective servers 110 and 120 recognize that the other system has gone down, and execute failover.

In concrete terms, the storage device 200 may have a construction such as that shown in FIGS. 2 and 3. The storage device 200 may comprise a plurality of port control parts 211 through 214, a failover detection part 220, a scheduler 230, a memory 240, a disk control part 250, a memory device 260 and an SVP 270.

The respective port control parts 211 through 214 are used to control data communications with the respective servers 110 through 140. For example, the respective port control parts 211 through 214 correspond to the communications ports 21A of the CHAs 21.

The failover detection part 220 detects the occurrence of failover or prognosticators of the occurrence of failover on the basis of commands or the like received from the respective port control parts 211 through 214. For example, the failover detection part 220 can be realized by means of the control program of the CHAs 21. The failover detection part 220 can detect (in a predictive manner) whether or not failover has occurred between the servers 110 and 120 by referring to a management table 242. The details of this detection processing will be described later.

The scheduler 230 controls the processing order of commands received from the respective servers 110 through 140. For example, the scheduler 230 can be realized as the control program of the CHAs 21, or as the control program of the CHAs 21 and DKAs 22. For example, the scheduler 230 processes commands from the respective servers 110 through 140 in a specified order by utilizing a queue 241. Furthermore, in cases where the occurrence of failover is detected, the scheduler 230 preferentially processes the commands from the failover destination server by referring to the management table 242. This processing will be described later.

For example, the memory 240 stores the queue 241 and the management table 242. For example, this memory 240 corresponds to the shared memory 24. However, the present invention is not limited to this; for example, a construction may also be used in which the management table 242 is stored in a specified region inside the memory device 260.

The disk control part 250 accesses the respective logical volumes 261 inside the memory device 260, and controls data communications with the logical volumes 261. For example, the disk control part 250 corresponds to the DKAs 22. The memory device 260 comprises numerous disk drives, and a plurality of logical volumes 261 which are logical memory devices are formed in each of these physical disk drives. In the following description, the logical volumes 261 will be called logical devices 261.

For example, the SVP 270 monitors the status of various parts inside the storage device 200, sets the RAID construction and the like. For example, the SVP 270 corresponds to the SVP 28 in FIG. 3. The user can alter the registered content of the management table 242 via the SVP 270.

Figure 5:
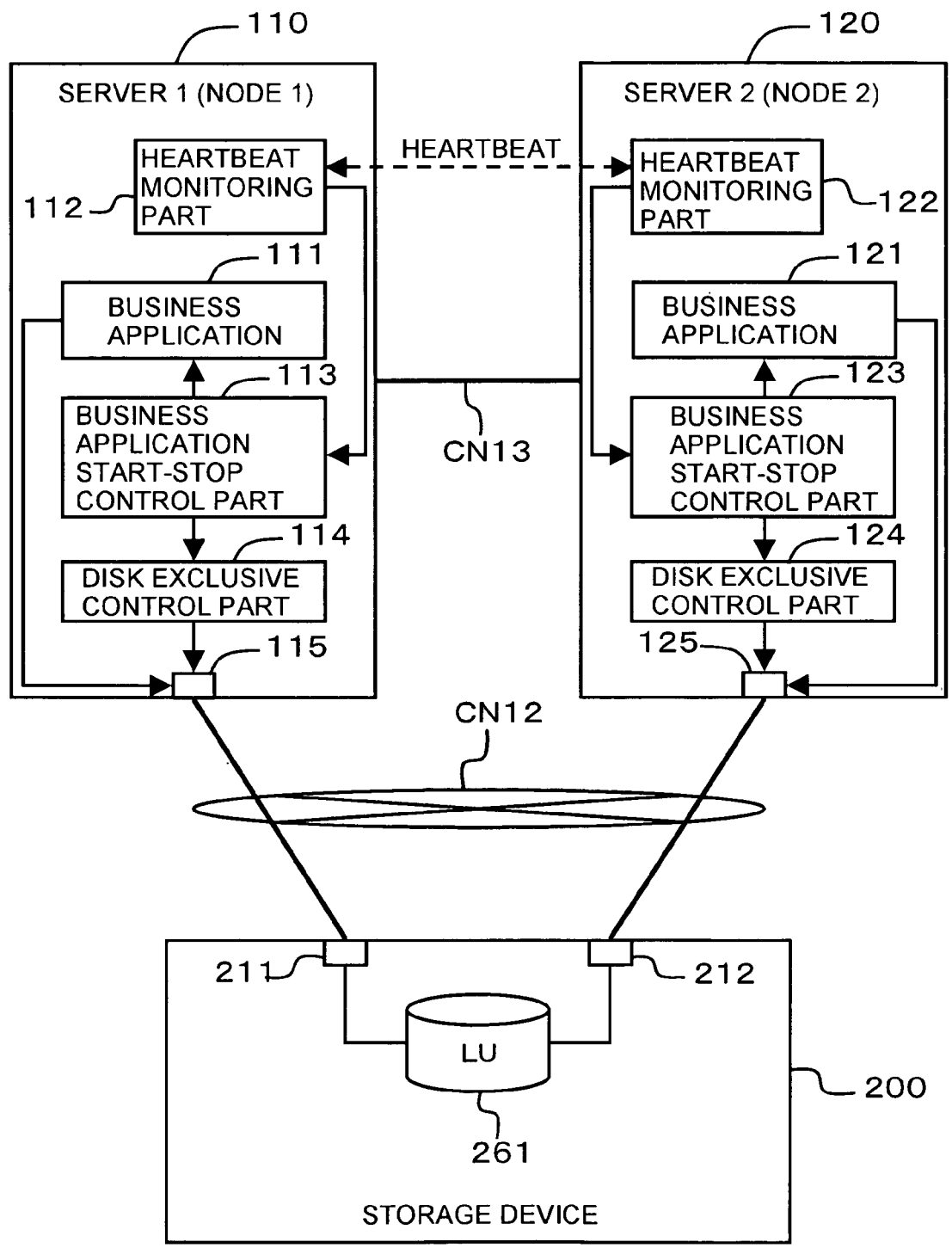
FIG. 5 is an explanatory diagram which shows the construction of the failover cluster.

The details of the failover system will be described with reference to FIGS. 5 and 6. For example, the first server 110 that forms the failover cluster may comprise a business application program (hereafter abbreviated to "business application") 111, a heartbeat monitoring part 112, a business application start-stop control part (hereafter abbreviated to "start-stop control part") 113, and a disk exclusive control part 114. Similarly, the second server 120 that forms the failover cluster may also comprise a business application 121, heartbeat monitoring part 122, start-stop control part 123 and disk exclusive control part 124.

The business applications 111 and 121 are programs that are used to perform services that are provided to the client terminals. The heartbeat monitoring parts 112 and 122 transmit and receive heartbeat signals, and monitor whether or not heartbeat communications are continued. The start-stop control parts 113 and 123 control the starting and stopping of the business applications 111 and 121. The disk exclusive control parts 114 and 124 perform exclusive control of the logical devices 261 shared by the respective servers 110 and 120.

For example, the server 110 can be connected to the port control part 211 of the storage device 200 via the communications network CN12 from a port 115 such as an HBA (host bus adapter) or the like. Similarly, the server 120 can be connected to the port control parts 212 of the storage device 200 via the communications network CN12 from the port 125. The respective servers 110 and 120 share one or a plurality of specified logical devices 261.

Figure 6A:
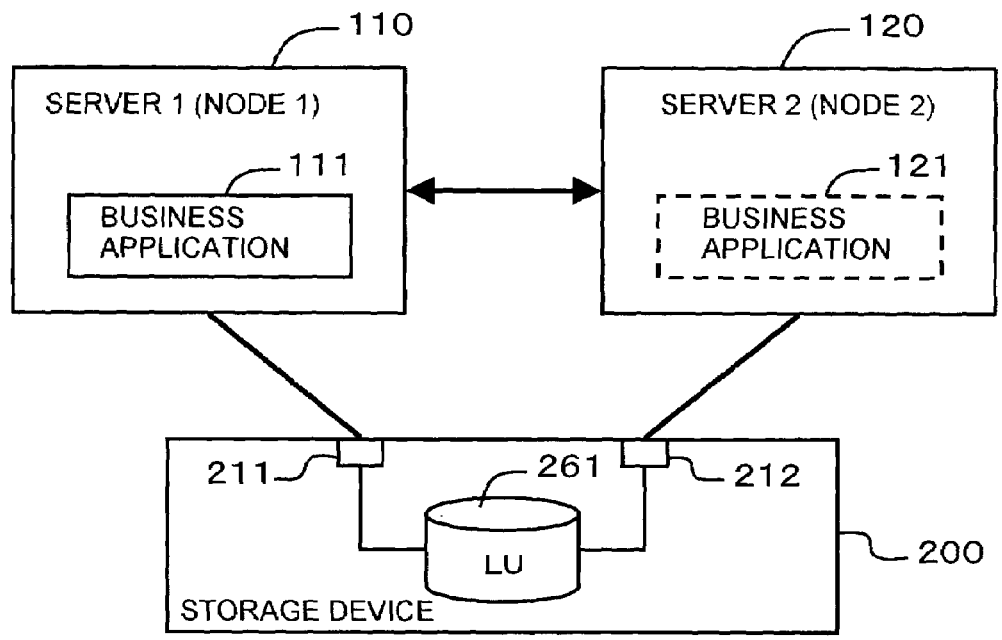
FIG. 6 is a model diagram which shows the conditions of failover.

The ordinary state is shown in FIG. 6(a). Under ordinary conditions, the server 110 is the server of the system actually in use (working system), and the server 120 is the server of the standby system. The failover cluster provides a service to the respective client terminals via the server 110. The shared logical devices 261 are used exclusively by the server 110. Furthermore, with regard to the business application service that is provided from the server 110, the server 110 is the server of the working system, and the server 120 is the server of the standby system; however, the server 120 may also provide its own business application service.

Figure 6B:
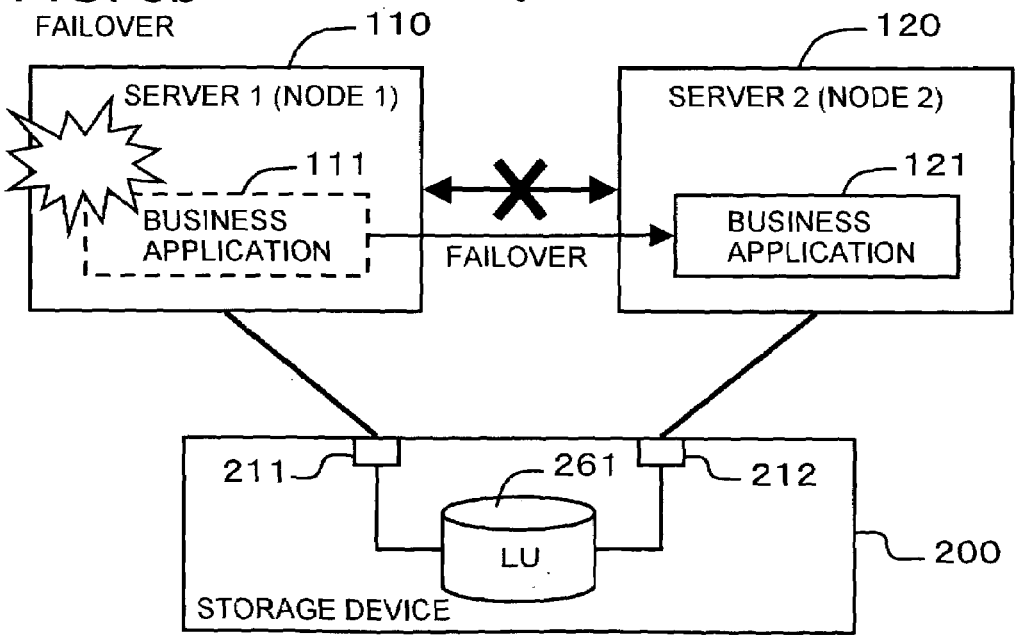

A case in which the system of the server 110 has gone down because of some type of failure, or in which the server 110 has been stopped in a planned stop, is shown in FIG. 6(b). As a result of the server 110 going down, the heartbeat communications between the servers 110 and 120 are interrupted. After a specified time has elapsed following the cutting of the heartbeat communications, the server 120 of the standby system executes failover processing. As a result, the server 120 takes over the service that is provided by the server 110. When this service is taken over, the IP addresses and the like of the server 110 are also taken over by the server 120. The server 120 changes from the standby system server to the working system server, and acquires exclusive access authorization to the shared logical devices 261.

In cases where client terminals request the provision of service during failover, an error is returned to the client terminals. When failover from the server 110 to the server 120 is completed, the client terminals receive the service from the terminal 120. The client terminals are not aware of which terminal in the cluster is providing the service. From the client terminals, the entire cluster is recognized as a single server.

The reason that the system waits for the passage of a specified time following the interruption of the heartbeat communications is that cases in which the transmission of heartbeat signals from the server 110 due to a temporarily high load or the like are taken into account. The system waits for the passage of a specified time in order to prevent useless failover processing from being initiated.

Meanwhile, it is necessary to shorten the failover time as far as possible. Depending on the type of service provided by the business application 111, there may be cases in which continuous operation 24 hours a day for 365 days a year is required. For example, in cases where failover from the server 110 to the server 120 is performed, various types of processing such as exclusive control of the shared logical devices 261, starting processing of the business application 121, processing that maintains the compatibility of data between the respective servers 110 and 120 and the like are performed. The performance of such processing accompanying failover generates numerous input-output requests to the storage device 200 from the failover destination server 120. If the responses to these respective input-output requests are respectively delayed, the time from the initiation of failover to the completion of failover is prolonged by an amount corresponding to this delay in the responses.

Conventionally, therefore, a delay of approximately 10 to 20 minutes has occurred. As will be described below, the present invention can shorten the failover time by improving the response characteristics of the storage device 200 with respect to the failback destination server during failover.

FIG. 7 is an explanatory diagram which shows the construction of the management table 242. For example, the management table 242 can be constructed by associating a plurality of tables T1 through T3.

For example, the server management table T1 can be constructed by establishing a correspondence among server IDs (identification codes) that are respectively used to identify the respective servers 110 through 140, WWN (world wide names), normal priority rankings, current rankings, priority rankings during failover, and flags indicating whether or not failover is currently in progress.

Here, the normal priority rankings indicate the processing priorities in an ordinary state other than a state in which failover processing is executed. For example, the priority rankings can be set in 10 steps. A smaller priority ranking number indicates a higher priority ranking. In the example shown in the figures, the same priority ranking of "5" is set for all of the servers 110 through 140. Accordingly, in a normal state, input-output requests respectively issued from the servers 110 through 140 are processed by the storage device 200 in an impartial manner. The current ranking refers to the currently set priority ranking. The priority ranking during failover refers to the priority ranking that is set prior to the initiation of failover, at the same time as the initiation of failover, or following the initiation of failover.

Since the respective servers 110 and 120 are in a mutual failover relationship, the priority rankings of these servers during failover are the same priority ranking. The reason for this is that it is unclear which of the two servers 110 and 120 will go down. If the server 110 goes down, the priority ranking of the failover destination server 120 is raised from the normal ranking of "5" to the failover ranking of "1". Conversely, if the server 120 goes down, the priority ranking of the failover destination server 110 is raised from the normal ranking of "5" to the failover ranking of "1". In the example shown in FIG. 6, the system is indicated as though a service is provided only by the server 110; however, the servers 110 and 120 may separately provide their own independent services to client terminals.

In the example shown in FIG. 6, a state is indicated in which failover is in progress between the servers 110 and 120, and the priority rankings of the respective servers 110 (N1) and 120 (N2) are respectively set at the maximum level. Furthermore, noting the other servers 130 (N3) and 140 (N4), the priority ranking of the server 130 does not change before and after the execution of failover. The priority ranking of the server 140 is normally "5", but is lowered to "7" during failover between the servers 110 and 120. Specifically, in the present embodiment, the degree of importance of the server 140 is low.

For example, the cluster management table T2 can be constructed by establishing a correspondence among cluster IDs that are used to identify the respective clusters, server IDs of the servers that form the respective clusters, objects of failover monitoring and the failover time. In the present embodiment, only a failover cluster (C1) formed by the servers 110 and 120 is indicated; however, it would also be possible to define other clusters. For example, the objects of failover monitoring may include the disk numbers of the logical devices that are shared by the clusters, and operating pattern IDs of the objects of monitoring. The failover time is the time required from the initiation of failover to the completion of failover; the failover cluster system is designed so that failover is completed within this failover time. Furthermore, as is shown in the figures, a construction may be used in which failover times are respectively set in cluster units, or a construction may be used in which failover times are respectively set for each operating pattern of the servers. Alternatively, a construction may also be used in which the operating patterns are classified into a plurality of groups, and failover times are respectively set for each group.

The failover detection pattern table (hereafter referred to as the "pattern table") T3 is a table which is used to define in advance the operating patterns that are used to detect the occurrence of failover. For example, the pattern table T3 can be constructed by establishing a correspondence among the operating pattern IDs used to identify the operating patterns, the failover detection patterns for each of the respective operating pattern IDs, and the processing contents of advance countermeasures taken in the case of failover detection.

For example, the operating pattern PA1 is a pattern that is used to detect "fiber channel link down". "Fiber channel link down" refers to a case in which (for example) a failure of some type occurs in the fiber channel switch or hub, fiber cable, HBA or the like, or in which a failure occurs in the I/O paths between the servers 110 and 120 and the storage device 200. In cases where such a fiber channel link down is detected, this is judged to be a prognosticator of the occurrence of failover, and the priority ranking of the server that forms a pair with the server using the I/O path in which a failure has occurred (i. e., the future failover destination server) is raised.

The operating pattern PA2 is a pattern that is used to detect "non-response of the host". For example, in cases where an ordinary response from a server is not returned for a specified time or longer, this can be judged to be a prognosticator of the occurrence of failover. In this case, the priority ranking of the server that forms a pair with the non-responding server is raised.

The operating pattern PB1 is a pattern that is used to detect "reception of a release command". This release command is a command which instructs the release of exclusive control with respect to the shared logical devices 261. Such a release command is issued by servers that have acquired an access lock to the shared logical devices 261. For example, cases in which a release command is issued are cases in which the working system server is stopped in a planned stop. Accordingly, in such cases, the priority ranking of the server that forms a pair with the server that issued the release command is raised.

The operating pattern PB2 is a pattern that is used to detect "reception of a reset command". This reset command is a command which forcibly releases the access lock to the shared logical devices 261. Cases in which a reset command is issued are cases in which failover occurs without any prognosticator such as link down, host non-response or the like. The failover destination server issues a reset command when failover is initiated, and forcibly releases the access lock to the shared logical device 261 acquired by the failover source server. Accordingly, in this case, the priority ranking of the server that issued the reset command, i. e., the failover destination server, is set at a higher priority.

The operating pattern PB3 is a pattern that is used to detect "reception of a reserve command". This reserve command is a command that is used to reserve the exclusive use of shared logical devices 261. In disk exclusive control, there may be cases in which a reset command is first issued, and a reserve command is then issued; however, there may also be cases in which a reserve command is issued without issuing a rest command. The operating pattern PB3 is defined in these latter cases.

The operating pattern PB4 is a pattern that is used to detect "reception of a write command for a specified address range". Here, the term "specified address range" refers to a specified memory region such as a quorum disk or the like which stores control information that is used to control the failover cluster. Examples of information used to control the cluster include the IDs of servers that have acquired an access lock to shared logical devices 261, mounting states of file systems and the like. Accordingly, cases in which a write command for such a specified address range is issued are (for example) cases in which the failover destination surface has updated the cluster control information and declared the use of shared logical devices 261. Consequently, in such cases, the priority ranking of the server that issued a write commend for this specified address range is raised.

Among the abovementioned operating patterns, PA1, PA2 and PB1 are operating patterns that allow the detection of the occurrence of failover prior to the initiation of processing by the failover destination server. Accordingly, in cases where these respective operating patterns PA1, PA2 and PB1 are detected, the priority ranking of the failover destination server can be raised prior to the initiation of failover, or at substantially the same time as the initiation of failover.

The other operating patterns PB2 through PB4 are operating patterns that are observe din the failover destination server. Accordingly, in cases where these operating patterns PB2 through PB4 are detected, the priority ranking of the failover destination server can be raised at substantially the same time as the initiation of failover, or immediately following the initiation of failover.

Thus, in the present embodiment, in cases where the occurrence of failover is detected, or in cases where the occurrence of failover is predicted, the priority ranking of the failover destination server is set at a higher ranking than the ordinary priority ranking. A point that should be noted here is that the priority ranking that is altered when the occurrence of failover is detected is not maintained "as is" as a fixed priority ranking, but is rather returned to the initial state (normal state) when failover is ended. As one example, preferential treatment is released with the passage of a preset failover time as a trigger (as will be described below). The fact that the priority rankings of specified servers are temporarily altered only during failover is one of the characterizing features of the present embodiment.

Figure 8A:
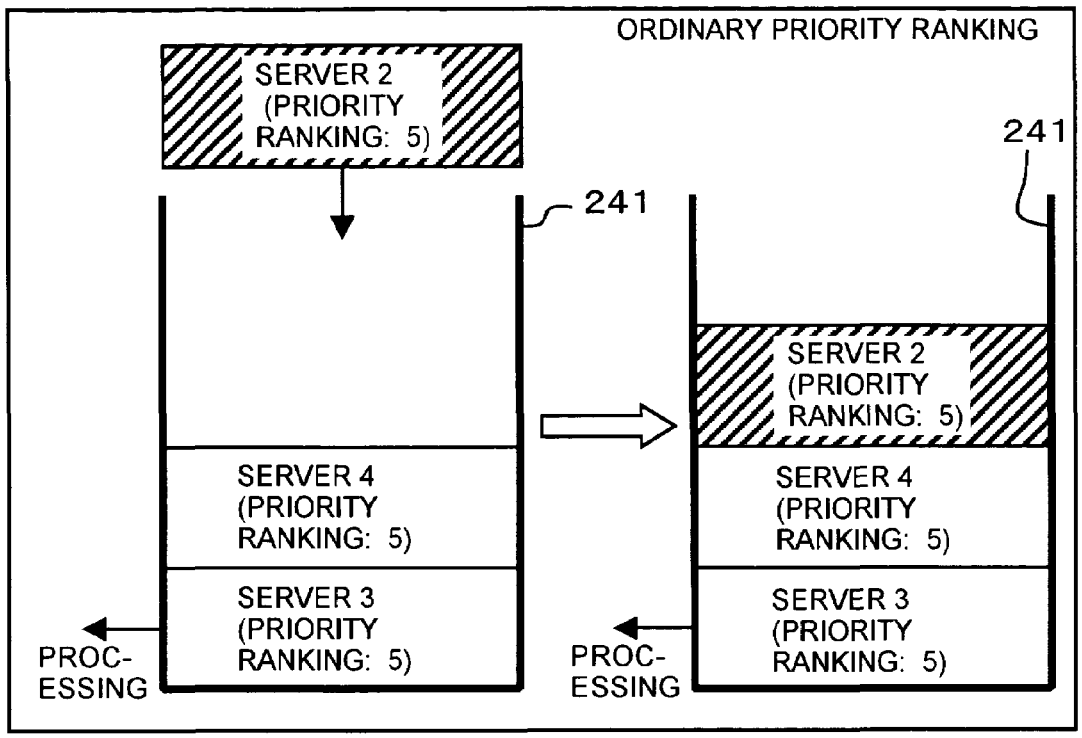
FIG. 8 is an explanatory diagram which shows the conditions of switching of the queue processing order on the basis of the priority ranking.

FIG. 8 is an explanatory diagram which shows a schematic outline of a method in which input-output requests from the servers are processed on the basis of the priority ranking. FIG. 8(a) shows the processing order under ordinary circumstances prior to the occurrence of failover or following the completion of failover. Input-output requests from the respective servers 110 through 140 are strung together in order of arrival in the queue 241.

In the example shown in FIG. 8(a), a state is shown in which input-output requests from the "server 4" (server 140) are lined up following input-output requests from the "server 3" (server 130), and input-output requests from the "server 2" (server 120) have newly arrived. The priority rankings of these respective servers are all set at "5", so that there is no difference in priority. Accordingly, in the queue 241, input-output requests are lined up in the order of arrival. The input-output requests are processed in the order of arrival using the FIFO (first-in first-out) system.

Figure 8B:
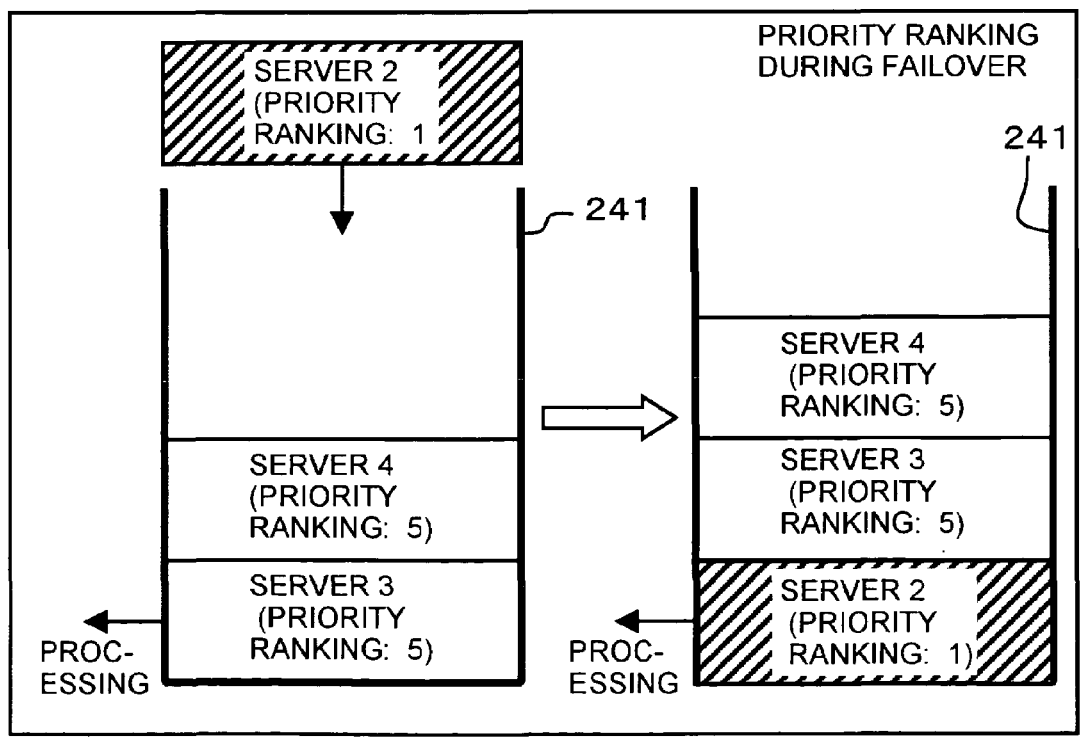

FIG. 8(b) shows the processing order during failover. During failover, the priority rankings of the respective servers that form the failover cluster are set at rankings that are higher than the ordinary rankings. The priority ranking of the "server 2" (server 120) is raised to the maximum level of "1" from the mean ranking of "5". Since the "server 2" is the failback destination server, a high priority ranking is given to this server. Accordingly, the input-output requests are rearranged in the queue 241. The input-output requests of the "server 2" that arrived later are lined up at the head of the queue 241 in preference to the other input-output requests that arrived earlier. Accordingly, the input-output requests of the "server 2" are preferentially processed.

Figure 9:
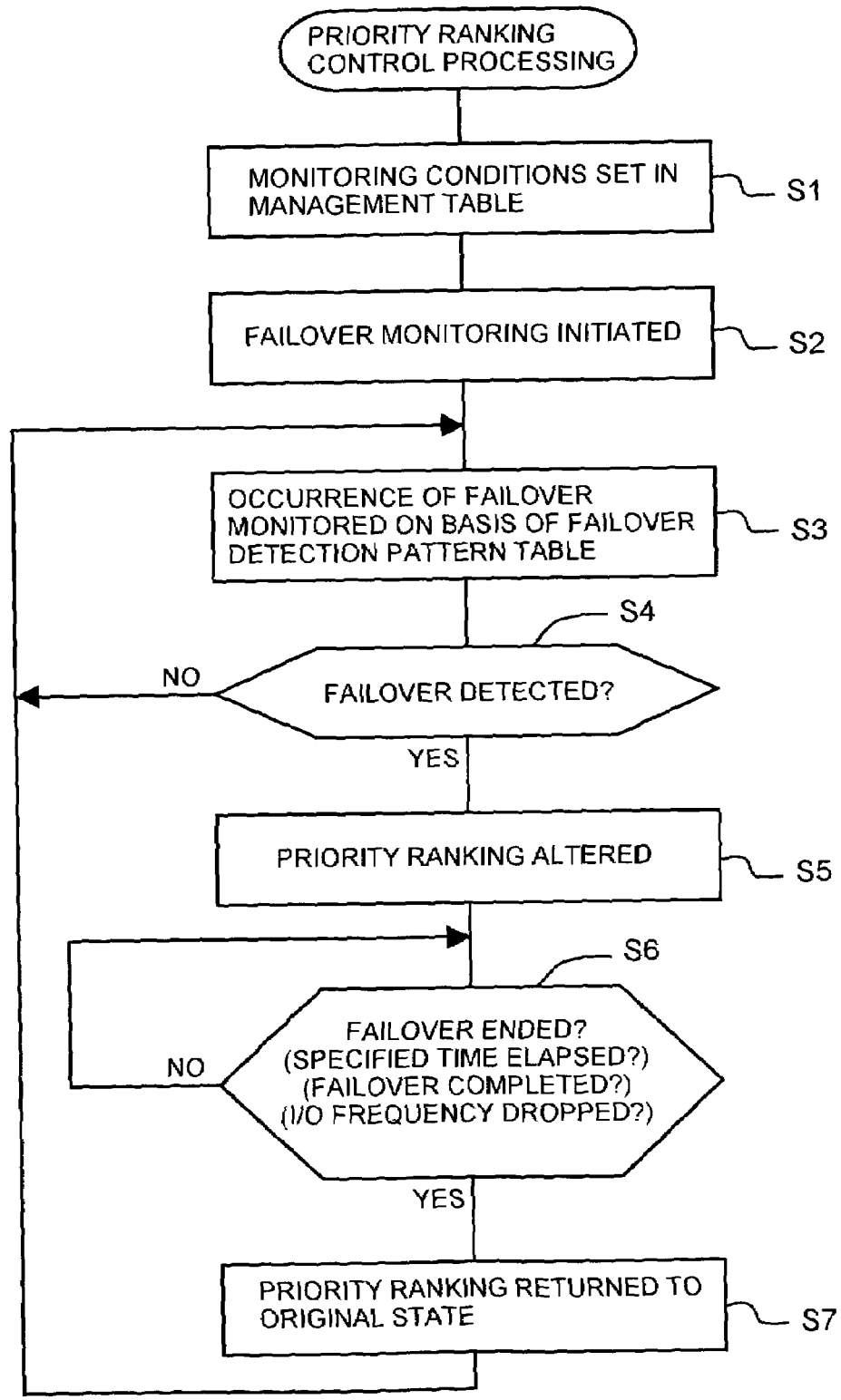
FIG. 9 is a flow chart which shows the priority ranking control processing.

FIG. 9 is a flow chart which shows the dynamic control processing of the priority rankings that is performed by the storage device 200. This flow chart shows a schematic outline of the processing, and differs from the actual program.

Figure 10A:
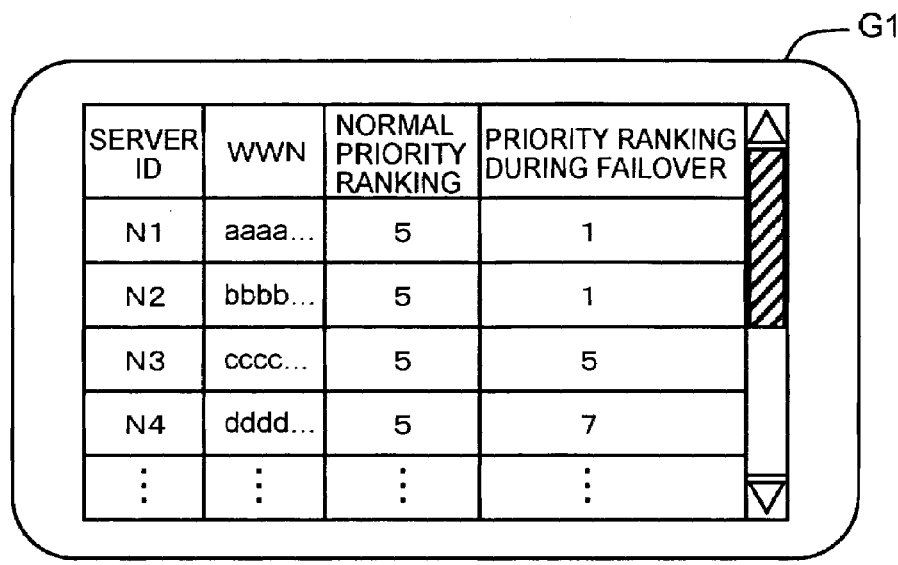
FIG. 10 is an explanatory diagram which shows an example of the screen used to set the monitoring conditions.

First, via a management terminal such as that shown in FIG. 3, the user registers the monitoring conditions of the server in the management table 242 (S1). As is shown in FIG. 10(a), the user respectively sets the normal priority rankings and the failover priority rankings (i. e., the rankings used when an abnormal event occurs) for some or all of the respective servers 110 through 140 that utilize the storage device 200. In the example shown in the figures, the priority rankings of the respective servers are designated by numerical values in 10 steps. However, the present invention is not limited to this; for example, a construction may also be used in which initial priority rankings that have been prearranged for failover are automatically set merely by the designation of the servers forming the failover cluster by the user. The contents input into the registration screen G1 shown in FIG. 10(a) are stored in the server management table T1.

Figure 10B:
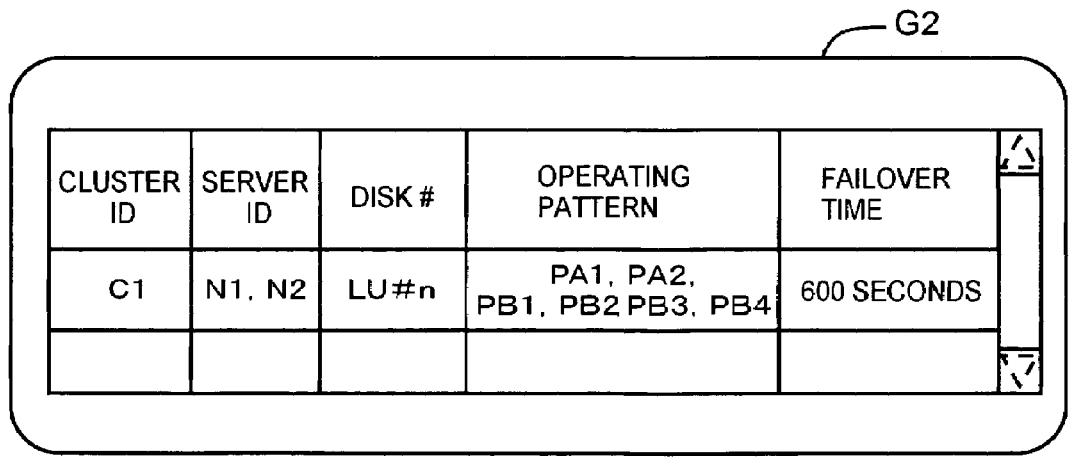

As is shown in FIG. 10(b), the user can designate one or a plurality of operating patterns (used for the detection of the occurrence of failover) and failover times for each failover cluster. The contents input into this registration screen G2 are stored in the cluster management table T2.

The description now returns to FIG. 9. After the setting of conditions in the management table 242 has been completed (S1), the storage device 200 initiates failover monitoring (S2). The storage device 200 periodically (with a relatively short period) collects information relating to channel path (I/O path) failure detected by the CHAs 21 and commands received by the CHAs 21. The storage 200 compares the information relating to these commands and the like with the cluster management table T2 and pattern table T3, and monitors the occurrence of failover (S3).

The storage device 200 monitors the occurrence of failover on the basis of whether or not the received commands match commands registered in the cluster management table T2, and whether or not channel path failure or non-response of a server has been detected (S4).

In cases where the occurrence of failover or a prognosticator of the same is detected (S4: YES), the storage device 200 alters the priority rankings of the respective servers 110 through 140 in accordance with the registered contents of the server management table T1 (S5). In concrete terms, the priority ranking of the failback destination server is altered so that this priority ranking is raised to a higher ranking than the ordinary priority ranking, and the priority rankings of servers with a low degree of importance are lowered to values lower than the ordinary priority rankings, or are set at the same values as the ordinary rankings.

The failover destination server frequently issues input-output requests to the storage device 200 in order to perform various types of processing that accompany failover. These input-output requests are preferentially processed in the storage device 200, and responses are quickly returned to the failover destination server from the storage device 200. Accordingly, the processing that accompanies failover is completed more quickly than in a conventional device.

The storage device 200 waits until failover is completed while maintaining the altered priority rankings (S6). This waiting for the completion of failover can be positioned as a condition for releasing the temporary alteration of the priority rankings during failover. As one example, failover can be viewed as being completed when a preset failover time has elapsed. As another example, it can also be inferred that failover has been completed when the frequency of occurrence of input-output requests from the failover destination server drops to a specified level. Alternatively, in cases where a command or information reporting the completion of failover is input into the storage device 200 from the failover destination server, the completion of failover can be detected by the reception of this command or the like.

In the present embodiment, in order to simplify the control structure, it is judged that failover has been completed when a preset specified failover time has elapsed. However, the present invention is not limited to this method; one of the other methods described above (or the like) may also be used.

When the completion of failover has been detected (S6: YES), the storage device 200 refers to the server management table T1, and returns the priority rankings of the respective servers 110 through 140 to the respective normal priority rankings (S7). As a result, the input-output requests of the respective servers 110 through 140 are respectively processed on the basis of the normal priority rankings.

Figure 11:
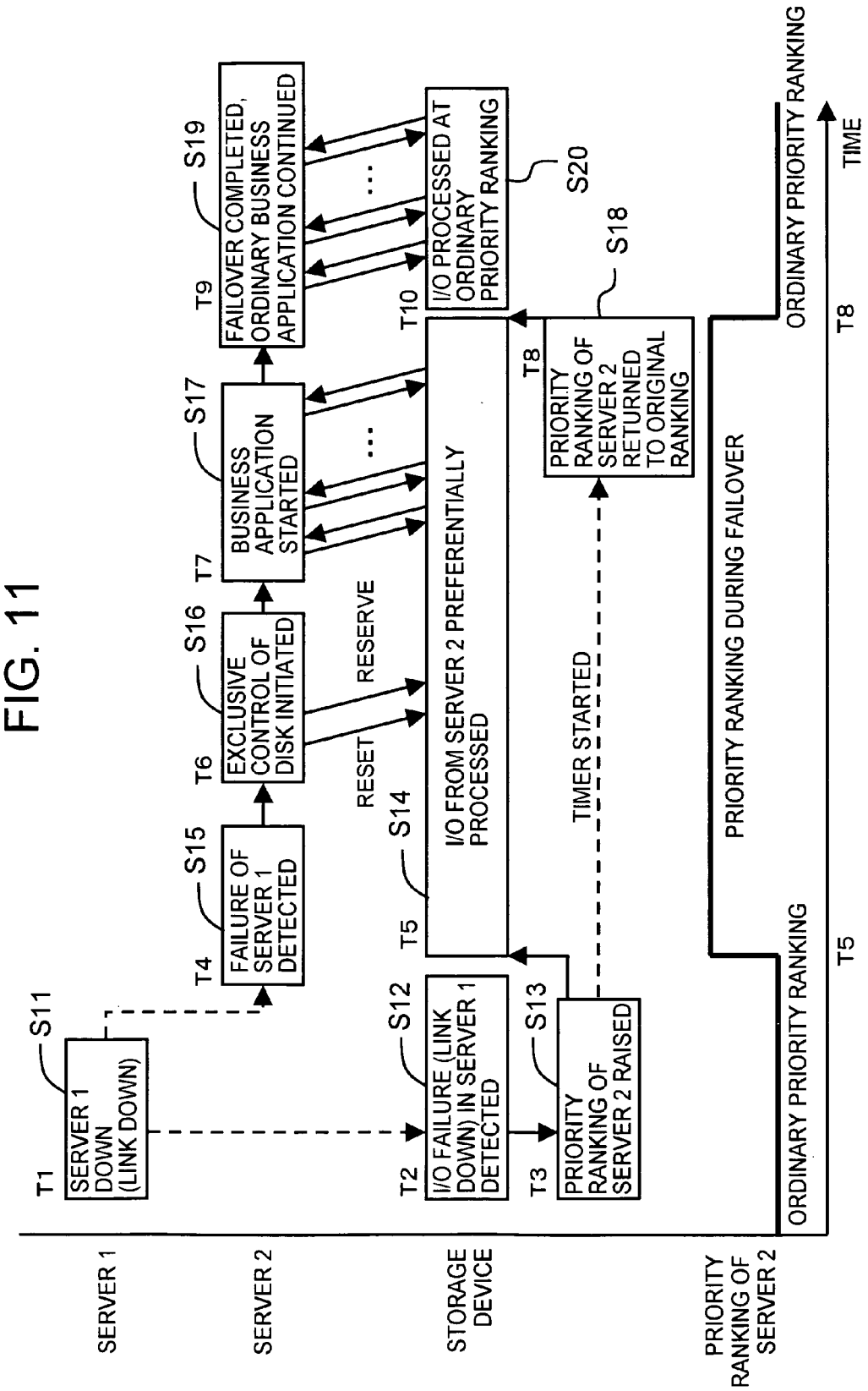

The concrete flow of processing for each operating pattern will be described with reference to FIGS. 11 through 14. FIG. 11 shows the flow in the case of the operating pattern PA1. Here, it is assumed that some type of failure occurs in the "server 1" (server 110) at time T1, and that a "fiber channel link down" occurs as a result (S11).

At time T2, this fiber channel link down is detected by the CHA 21 of the storage device 200 (S12). At time T3, the storage device 200 alters the priority ranking of the "server 2" (server 120), which is the failover destination server, to the maximum level (S13). As a result, at time T5, the storage device 200 makes preparations for processing input-output requests from the server 120 at the highest priority ranking (S14). Furthermore, after the priority ranking of the server 120 has been set at a high ranking, a timer which is used to measure the failover time is started.

After previously causing the occurrence of a "link down", the server 110 causes the system to go down. As a result, the heartbeat communications are interrupted. When the heartbeat communications are interrupted, the server 120 detects the "system down" of the server 110 at time T4 (S15). At time T6, the server 120 initiates the exclusive control of the shared logical devices 261 by issuing a reset command or reserved command (S16). As a result, the shared logical devices 261 that are necessary in order to provide the business application service can be used by the server 120.

At time T7, the server 120 starts the business application 121, and sends out the input-output requests that are necessary in order to provide the service (S17). As a result of these input-output requests, for example, the necessary data base and the like are constructed in the server 120. The input-output requests from the server 120 are preferentially processed at the highest priority ranking. The priority ranking of the failover destination server 120 is set at a high ranking in advance, prior to the detection of the down status of the server 110 by the server 120 and the initiation of disk exclusive control. As a result, the storage device 200 can quickly return responses to the input-output requests from the server 120.

At time T8, at which a specified failover time has elapsed from the point in time (T3) at which the priority ranking of the server 120 was altered to the maximum level, the storage device 200 returns the priority ranking of the server 120 to the ordinary priority ranking (S18).

At time T9, which is approximately the same time as the time at which the priority ranking is altered to the initial state, the server 120 completed failover, and continues to provide the business application service "as is" (S19). At time T10, the storage device 200 processes input-output requests from the server 120 in accordance with the ordinary priority ranking (S20).

The timing at which the high priority ranking during failover is returned to the ordinary priority ranking is determined by the failover time. For example, this initialized timing can be set immediately after or immediately before the completion of failover. However, the present invention is not limited to this. Even in cases where the priority ranking during failover is returned to the ordinary priority ranking after most of the processing accompanying failover has been completed, the failover time can be shorted compared to that in a conventional system.

Furthermore, the flow shown in FIG. 11 is also substantially the same in the case of the operating pattern PA2. In cases where non-response of the server 110 is detected, the priority ranking of the server 120 can be set at a high ranking prior to the initiation of disk exclusive control.

Figure 12:
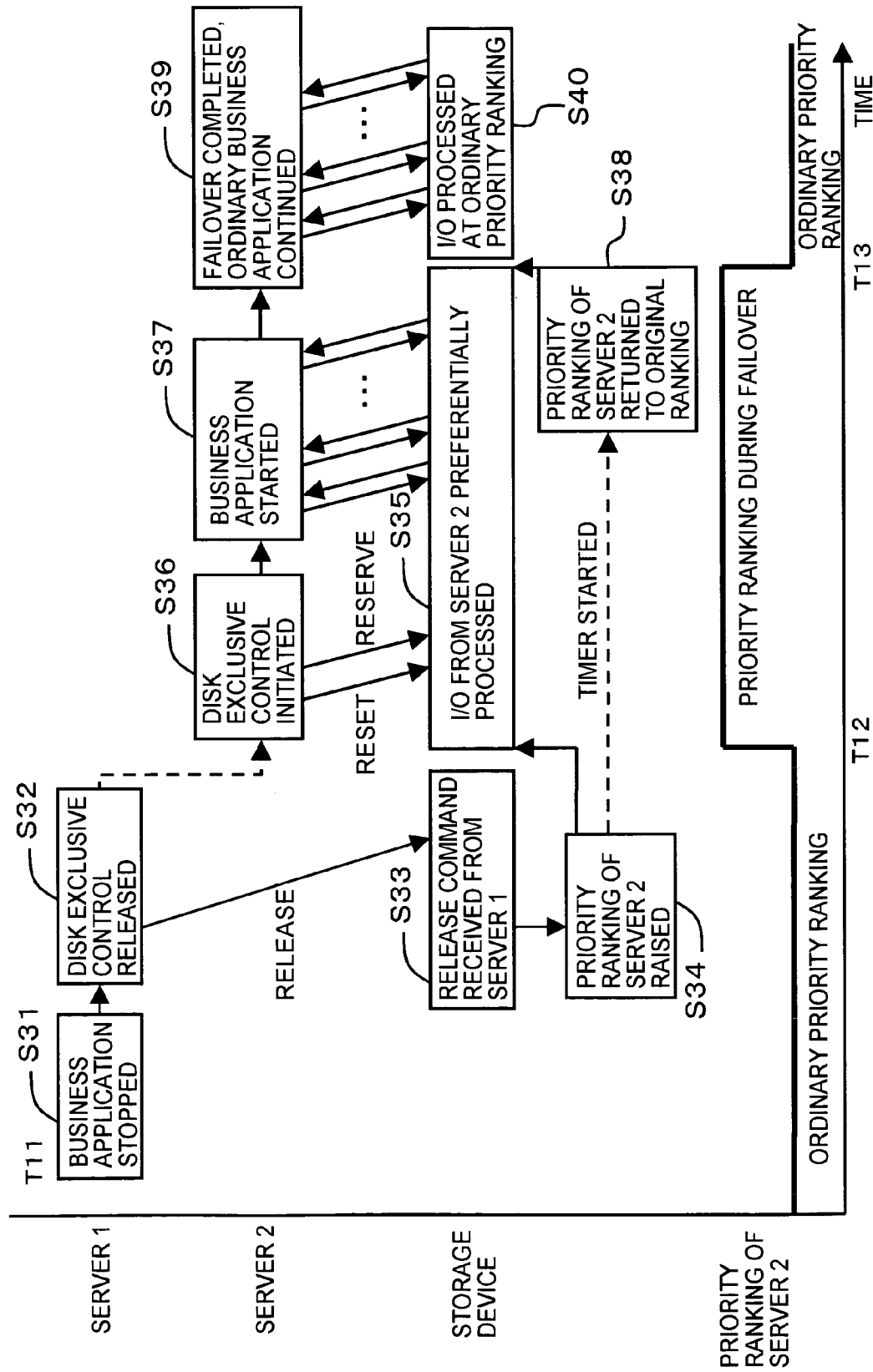

FIG. 12 shows the flow in the case of the operating pattern PB1. For example, the operating pattern PB1 appears in cases where there is a planned stop of the server 110.

At time T11, the user stops the business application 111 of the server 110 (S32). As a result, failover processing is initiated. The failover server 110 releases the exclusive control of the shared logical devices 261 by issuing a release command (S32).

When the storage device 200 receives the release command from the server 110 (S33), the storage device 200 alters the priority ranking of the server 120 constituting the failover destination from the ordinary priority ranking to the high priority ranking used during failover (S34). At the same time (T12), the storage device 200 starts the timer that regulates the failover time.

The storage device 200 processes the input-output requests from the server 120 at the high priority ranking, and quickly returns responses (S35). After the server 110 releases the exclusive control of the shared logical devices 261, the server 120 recognizes the initiation of failover, and acquires an access lock for the shared logical devices 261 (S36). Then, in the same manner as described above, the server 120 frequently sends out input-output requests to the storage device 200 in order to perform various types of processing that accompany failover (S37).

When the failover time has elapsed (T13), the priority ranking of the server 120 is returned to the ordinary priority ranking (S38). The server 120 completes failover, and continues to provide the business application service "as is" (S39). The storage device 200 processes the input-output requests from the server 120 in accordance with the ordinary priority ranking (S40).

Figure 13:
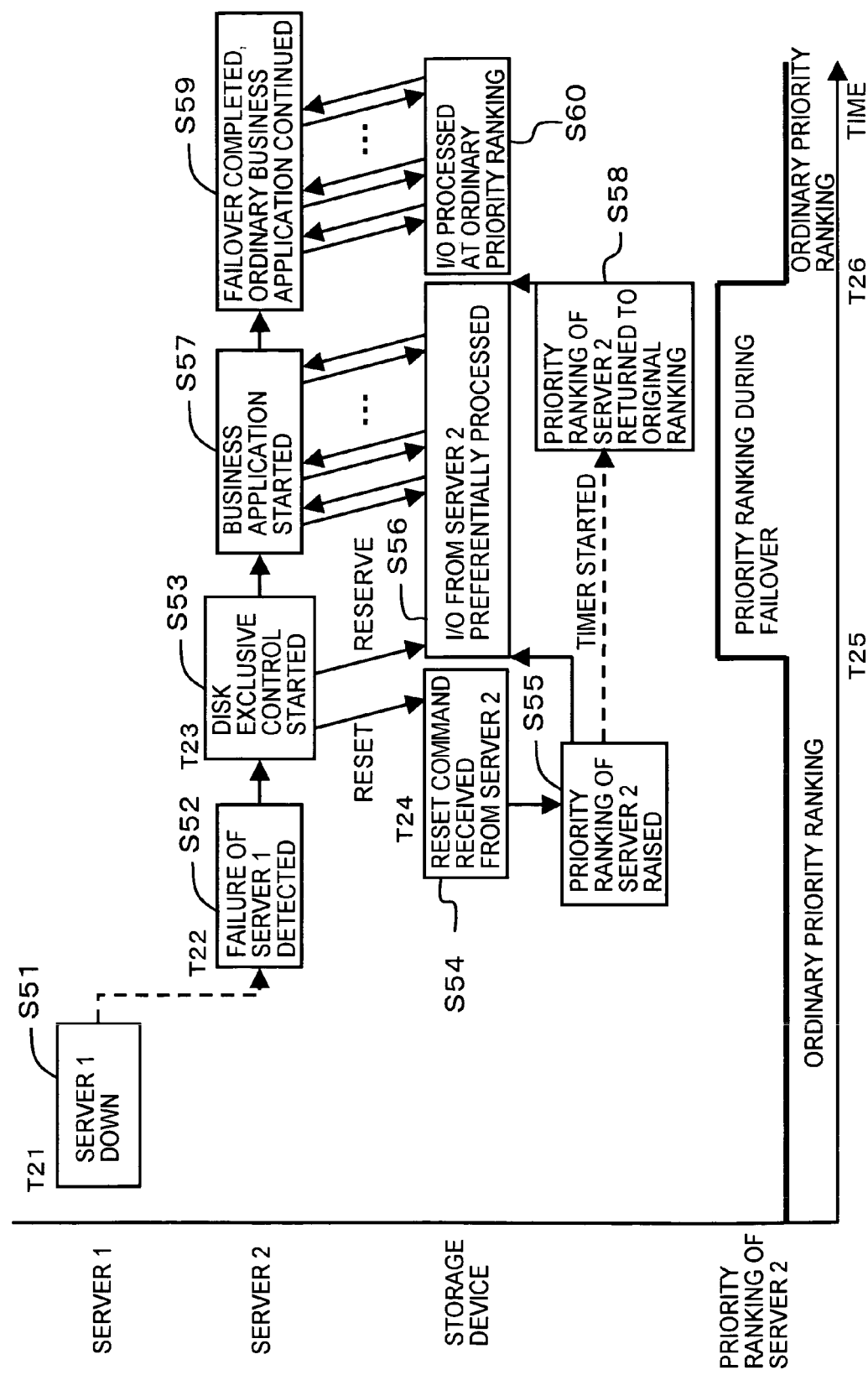

FIG. 13 shows the flow in the case of the operating pattern PB2. For example, the operating pattern PB2 appears in cases where the server 110 goes down without the occurrence of an event such as "link down" or non-response.

At time T21, the server 110 goes down as a result of some type of failure (S51). As a result, the heartbeat communications are interrupted, and at time T22, the server 120 detects the fact that the server 110 has gone down (S52). At time T23, the server initiates exclusive control of the shared logical devices 261 by issuing a reset command or release command (S53).

At time T24, the storage device 200 receives the reset command from the server 120 (S54). As a result of receiving this reset command, the storage device 200 sets the priority ranking of the server 120 at a ranking that is higher than the ordinary priority ranking (S55). At the same time, the storage device 200 starts the time that is used to release the temporary alteration of the priority ranking.

The storage device 200 preferentially processes the input-output requests from the server 120 (S56, T25). The server 120 sends frequent input-output requests to the storage device 200 in order to perform the various types of processing that accompany failover (S57). When the failover time has elapsed (T26), the storage device 200 returns the priority ranking of the server 120 to the ordinary priority ranking (S58). Following the completion of failover, the server 120 continues to provide the business application service (S59). The storage device 200 processes the input-output requests from the server 120 in accordance with the ordinary priority ranking (S60).

Furthermore, the flow shown in FIG. 13 is substantially the same in the case of the operating pattern PB3 as well. In the case of the operating pattern PB3, a release command is issued without a reset command being issued. When the storage device 200 receives the release command from the server 120, the storage device 200 alters the priority ranking of the server 120 to the failover priority ranking.

Figure 14:
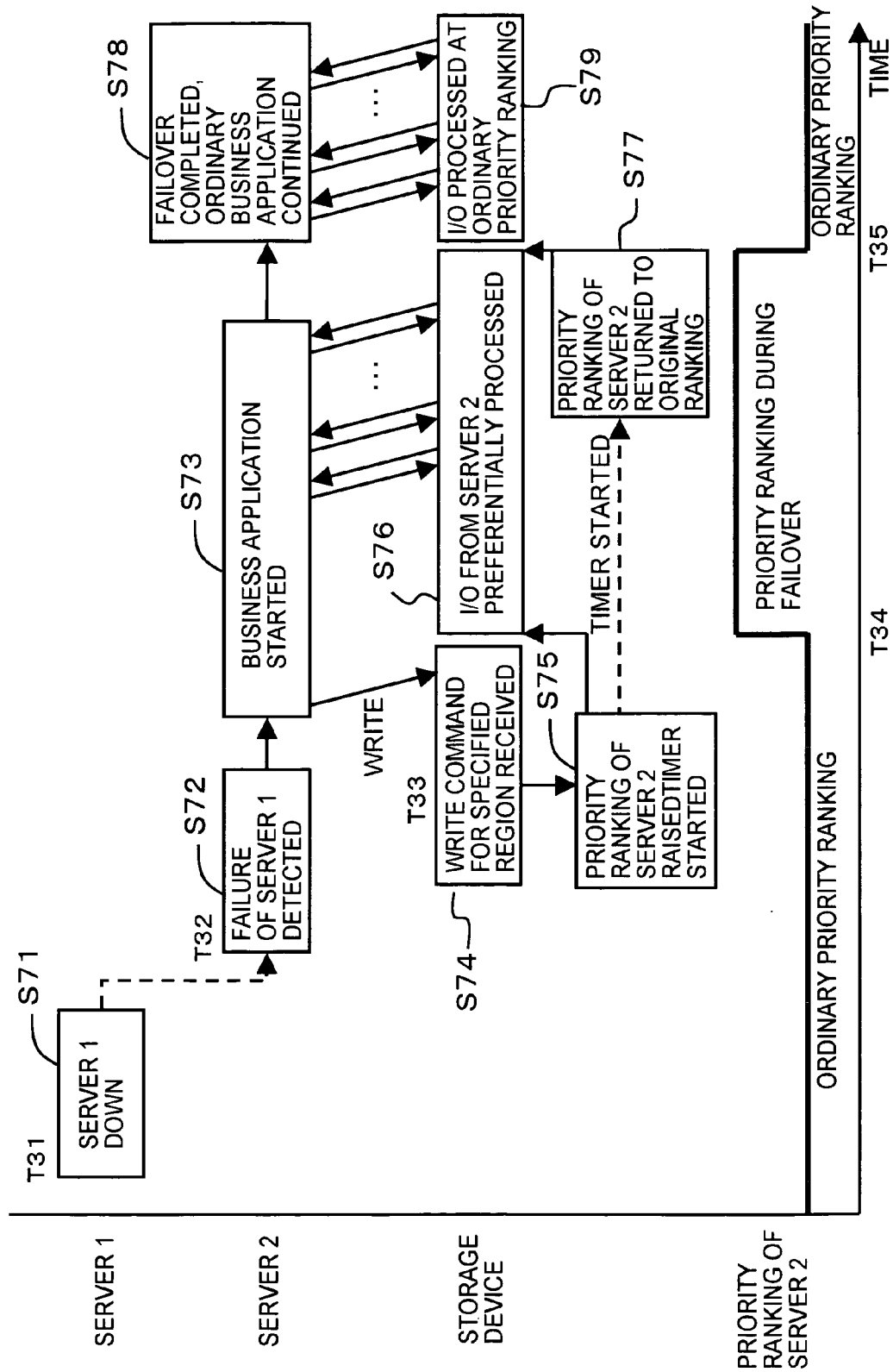
FIG. 14 is an explanatory diagram which shows the progression of failover in cases where exclusive control is not performed.

FIG. 14 shows the flow in the case of the operating pattern PB4. For example, the operating pattern PB4 appears in cases where failover is performed without the occurrence of a "link down" or the like in construction in which exclusive control of the shared logical devices 261 is not performed.

At time T31, the server 110 goes down, and when the heartbeat communications are cut off (S71), the server 120 detects that the server 110 has gone down (S72, T32). As a result, the server 120 issues a write command whose object is a specified address region, and rewrites the cluster control information.

At time T33, when the storage device 200 receives the write command for the specified address region (S74), the storage device 200 alters the priority ranking of the server 120 from the ordinary priority ranking to the failover priority ranking (S75, T34). At the same time, the timer that measures the failover time is started. The storage device 200 preferentially processes the input-output requests from the server 120 (S73). As a result, the respective types of processing that accompany failover are quickly performed. Then, at time T35, when the specified failover time has elapsed, the storage device 200 returns the priority ranking of the server 120 to the ordinary priority ranking from the failover priority ranking (S77).

Even after failover is completed, the server 120 continues to provide the business application service (S78). the storage device 200 processes the input-output requests from the server 120 in accordance with the ordinary priority ranking (S79).

As a result of being constructed as described above, the present embodiment possesses the following merits. In the present embodiment, a construction is used in which the statuses of the respective servers 110 through 140 are respectively observed on the side of the storage device 200, and the priority rankings of the respective servers 110 through 140 are dynamically altered in accordance with the results of this observation. Accordingly, the priority rankings can be set in accordance with the statuses of the respective servers 110 through 140.

In the present embodiment, a construction is used which is such that in cases where an abnormal event (occurrence of failover or a prognosticator of the occurrence of failover) on the side of the respective servers 110 through 140 is detected on the side of the storage device 200, the priority ranking of the server that forms a pair with the server in which this abnormal event has occurred is raised. Accordingly, recovery from the abnormal event (completion of failover) can be quickly realized.

Specifically, in the present embodiment, a construction is used in which input-output requests from the failover destination server are preferentially processed during failover. Accordingly, in the storage device 200, which is utilized not only by the servers 110 and 120 that form the failover cluster, but also by other servers 130 and 140, the response characteristics during failover can be improved, so that the failover time can be shortened.

In the present embodiment, a construction is used in which operating patterns PA1 through PB4 that are associated with the occurrence of failover are defined beforehand, and the method used to alter the priority ranking is set in accordance with each of these operating patterns. Accordingly, failover can be detected by means of a relatively simple construction, and a priority ranking suitable for failover can be set.

In the present embodiment, a construction is used which is such that when a preset failover time has elapsed, the priority ranking of the failover destination server is returned to the ordinary priority ranking. Accordingly, the priority ranking can be dynamically controlled in accordance with the conditions of progression of failover, so that the computer resources of the storage device 200 can be effectively utilized. Furthermore, since the present invention used during failover is returned to the initial state by means of time control, the control construction can be simplified.

In the present embodiment, a construction is used in which the statuses of the servers 110 through 140 are monitored on the side of the storage device 200, and the priority rankings are set in accordance with the statuses of the servers. Accordingly, there is no need to add a special function on the server side, and the priority rankings can be dynamically altered inside the storage device 200, so that the response characteristics during failover can be improved, and the failover time can be shortened. As a result, even in cases where the server construction such as the number of machines connected, type of OS or the like changes, such changes can be handled.

2. Second Embodiment

Figure 15:
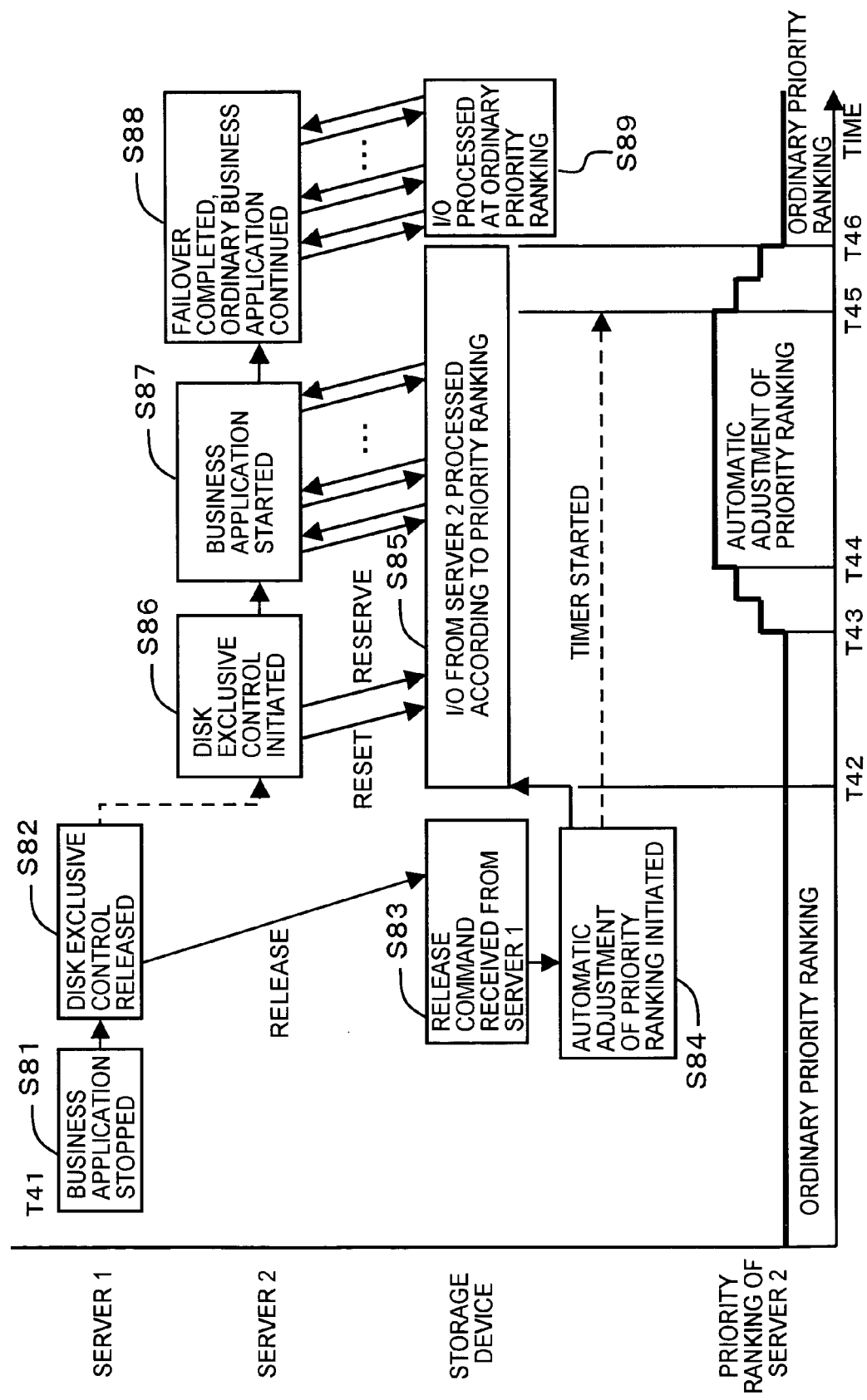
FIG. 15 is an explanatory diagram which relates to a second embodiment of the present invention, and which shows how the priority ranking is controlled in steps in cases where a detected operating pattern is unregistered.
Figure 16:
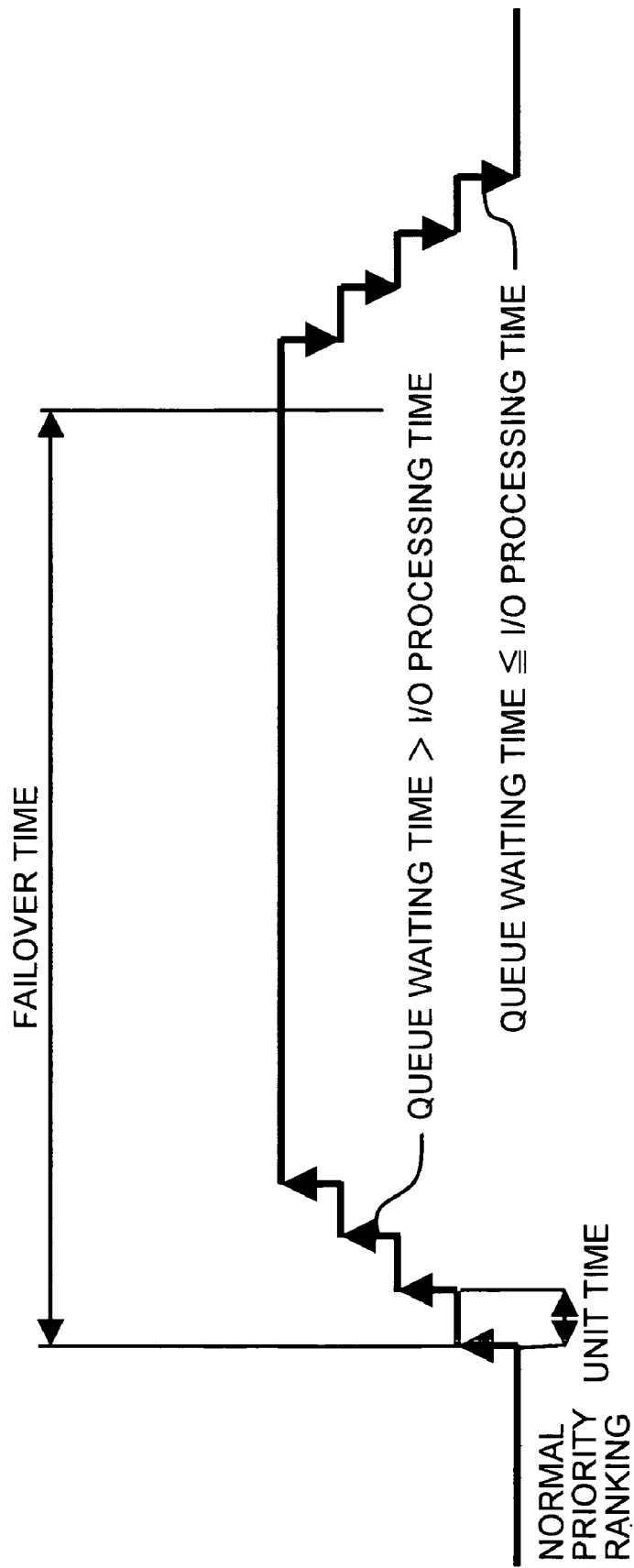
FIG. 16 is an explanatory diagram which shows how the priority ranking varies in steps.

A second embodiment will be described with reference to FIGS. 15 and 16. This embodiment has the status of a modification of the first embodiment. The characterizing feature of the present embodiment is that even in cases where a status (operating pattern) that is not registered in the management table is detected, the quantity of input-output requests from the servers and the like are taken into account, and the priority rankings are varies in steps.

In the present embodiment, a case is indicated in which the operating pattern PB1 is detected under conditions in which this operating pattern PB1 is not registered in the cluster management table TA2. At time T41, the business application 111 of the server 110 is stopped in a planned stop (S81). The server 110 releases the exclusive use of the shared logical devices 261 by issuing a release command (S82).

When the storage device 200 receives the release command from the server 110 (S83), the storage device 200 refers to the cluster management table TA2. In the present embodiment, the operating pattern PB1 that is used for the detection of "release command reception" is not registered in the cluster management table TA2. Accordingly, the storage device 200 that has received the release command does not alter the priority ranking of the server 120 that constitutes the failover destination server.

However, in cases where a status that is not registered in the cluster management table TA2 is detected, the storage device 200 initiates an automatic adjustment of the priority rankings (S84, T42). As is shown in FIG. 16 as well, the storage device 200 raises the priority ranking of the server 120 by 1 step in cases where the input-output requests per unit time increase so that the queue waiting time is longer than the input-output request processing time (queue waiting time>I/O processing time) (T43).

The priority ranking that has thus been tentatively raised is not lowered until a preset failover time has elapsed. Accordingly, even in cases where the queue waiting time drops below the input-output request processing time after time T43, the storage device 200 maintains the current priority rankings. Each time that the queue waiting time exceeds the input-output request processing time, the storage device 200 raises the priority ranking by one step.

The storage device 200 processes the input-output requests from the server 120 while raising the priority ranking of the server 120 in steps on the basis of the queue waiting time and the like (S85). The server 120 sends input-output requests to the storage device 200 in order to perform exclusive control of the shared logical devices 261 (S86), business application starting processing (S87) and the like. These input-output requests from the server 120 are processed in the storage device 200 on the basis of the priority ranking that is raised in steps.

When a specified failover time has elapsed following the initiation of the step-wise control of the priority ranking, the storage device 200 lowers the priority ranking of the server 120 in steps. As is shown in FIG. 16 as well, the priority ranking is lowered by one step in cases where the queue waiting time drops below the I/O processing time (queue waiting time≦I/O processing time). The lower limit value of the priority ranking is the normal (ordinary) priority ranking that is set for the server 120. In cases where the priority ranking of the server 120 has been lowered to the normal priority ranking, the storage device 200 does not lower the priority ranking any further.

The server 120 continues to perform the ordinary business application after failover is completed (S88). The storage device 200 processes the input-output requests from the server 120 on the basis of the priority ranking that is lowered in steps or the normal priority ranking (S89).

Furthermore, the width of the variation that is performed when the priority ranking is varied in steps is not limited to one step; this priority ranking may be varied by a plurality of steps. Furthermore, the variation width in cases where the priority ranking is raised and the variation width in cases where the priority ranking is lowered may be varied.

Furthermore, the present embodiment may also be applied to the other servers 130 and 140 that do not form a failover cluster. The priority ranking can be altered in steps in accordance with the utilization states from the respective servers 130 and 140. In cases where the failover time is not set in advance, the initial set values may be used. Furthermore, the present embodiment may also be limited to only the servers 110 and 120 that form a failover cluster.

The method that is used to vary the priority ranking in steps is not limited to the abovementioned comparison of the queue waiting time and I/O processing time. For example, a construction may be used in which the priority ranking is raised in cases where the number of I/O requests per unit time (access frequency) exceeds a specified value or the like.

In the present embodiment, the following merits are obtained in addition to the merits of the abovementioned embodiment. In the present embodiment, a construction is used in which the priority ranking is raised in steps on the basis of the queue waiting time and I/O processing time in cases where an operating pattern that is not registered in the cluster management table TA2 is detected. Accordingly, the priority ranking can be raised in steps on the basis of the actual use conditions (I/O processing conditions) even in cases where the user forgets to register an operating pattern or cases where an unexpected operating pattern is detected. As a result, the priority ranking can be automatically set in accordance with the actual use conditions, so that the response characteristics of the storage device can be improved.

In the present embodiment, a construction is used in which the priority ranking is lowered in steps on the basis of the queue waiting time and I/O processing time after a preset failover time has elapsed. Accordingly, the storage device can process input-output requests from the servers on the basis of a relatively high priority ranking corresponding to the actual use conditions during the failover time. Furthermore, after the failover time has elapsed, the storage device 200 lowers the priority ranking in steps on the basis of the actual use conditions, so that the computer resources can be assigned to processing from other servers.

In the present embodiment, a construction is used in which the priority ranking is varied in steps on the basis of the actual utilization state of the storage device even in cases where the operating pattern is not registered in the cluster management table TA2. Accordingly, the computer resources of the storage device 200 (resources used to process input-output requests) can be distributed in accordance with the actual conditions of utilization.

3. Third Embodiment

A third embodiment will be described with reference to FIGS. 17 through 20. This embodiment has the status of a modification of the first embodiment. The characterizing feature of this embodiment is that the priority rankings are dynamically altered in accordance with the load states of the respective servers and the operating patterns at the time that failover occurs.

Figure 17:
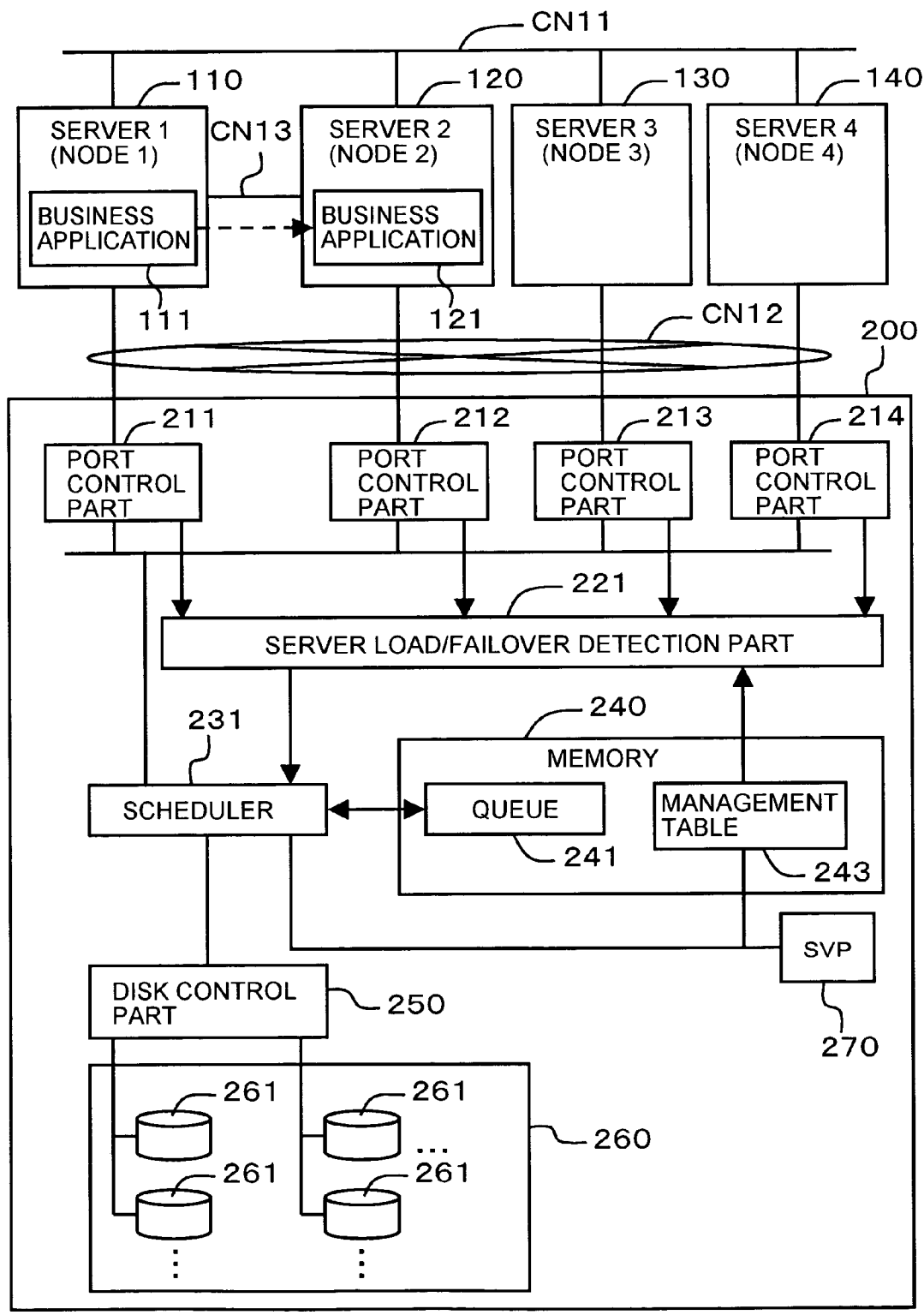
FIG. 17 is a block diagram of a storage system constituting a third embodiment of the present invention.

FIG. 17 is a block diagram which shows an overall outline of the storage system. The failover detection part 221 of the present embodiment not only detects failover within the failover cluster, but also detects whether or not the respective servers 110 through 140 are in an overload state. The management table 243 comprises substantially the same construction as the management table 242. However, as is shown in FIG. 18, flags which indicate whether or not the priority ranking during overload and the overload state are currently being handled are included in the server management table TA1a that forms a part of the management table 243. Furthermore, the scheduler 231 respectively processes the input-output requests from the respective servers 110 through 140 on the basis of priority rankings determined by the management table 243.

Here, the "priority ranking during overload" indicates the present invention given to a server when the load of this server exceeds a specified value. The maximum level priority rankings are respectively set in the respective servers 110 and 120 that form the failover cluster. Accordingly, in cases where one of these servers 110 or 120 is in an overload state, a high priority ranking is assigned regardless of the presence or absence of failover execution.

Figure 19:
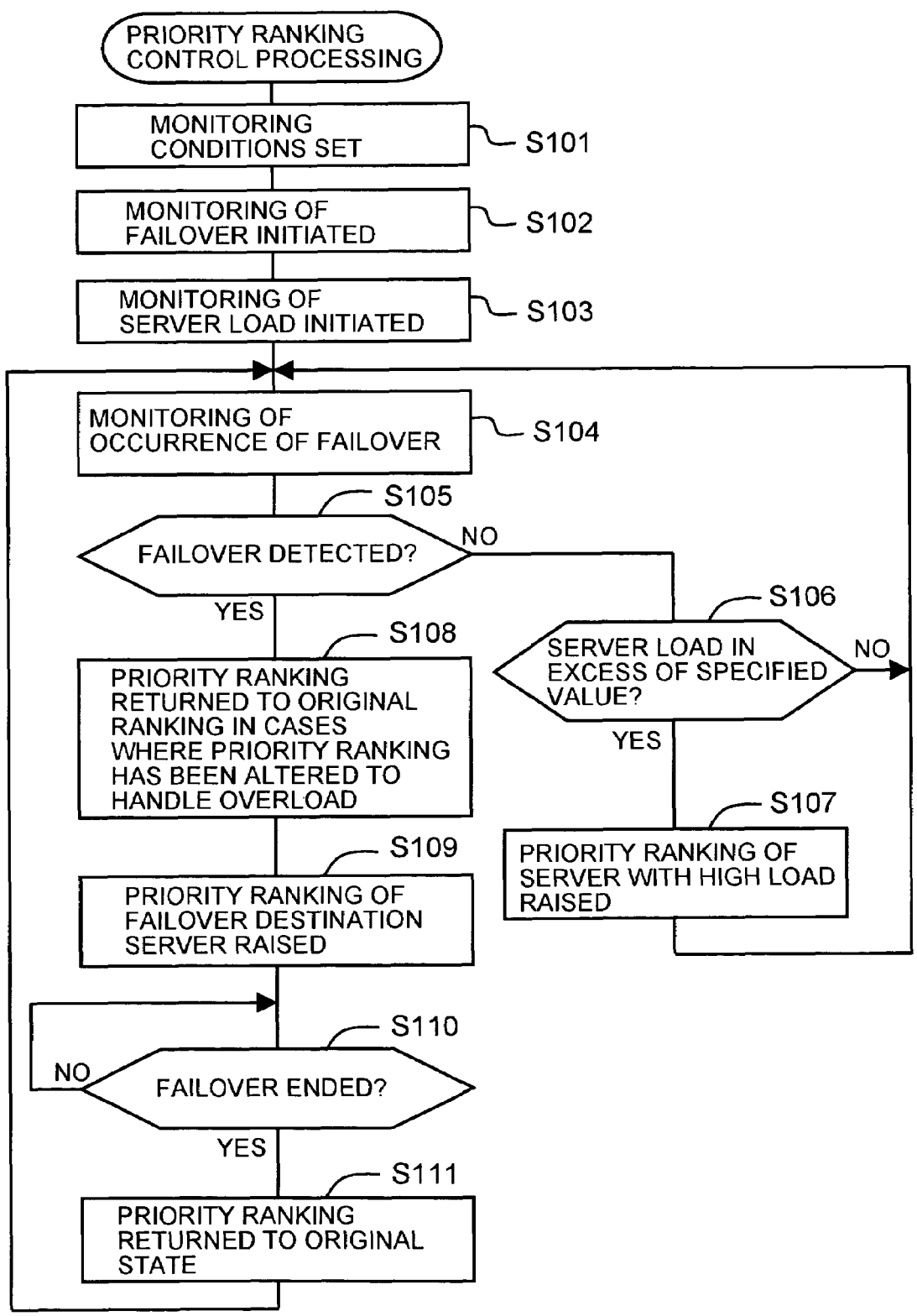
FIG. 19 is a flow chart which shows the priority ranking control processing.

FIG. 19 is a flow chart which shows an outline of the processing that is used for dynamic control of the priority ranking on the basis of the server load states and conditions of occurrence of failover. The user sets specified monitoring conditions in the management table 243 (S101). In accordance with the monitoring conditions registered in the management table 243, the storage device 200 monitors the occurrence of failover (S102). The storage device 200 monitors the load states of the respective servers 110 through 140 (S103).

In cases where the occurrence of failover is not detected (S105: NO), a judgement is made as to whether or not the server load exceeds a specified value (S106). In cases where a server in an overload state exceeding this specified value is detected (S106: YES), the storage device 200 sets the priority ranking of the server in this overload state at a high ranking on the basis of the server management table TA1a (S107). Here, for example, the method used to detect the server load may be a method in which the quantity of input-output requests or the like from the server per unit time is measured.

In cases where the occurrence of failover or a prognosticator of the same is detected (S105: YES), the storage device 200 makes a judgement as to whether or not the priority ranking of the server has already been altered in order to handle an overload state, and in cases where the priority ranking has already been altered, this priority ranking is returned to the original state (S108). Next, the storage device 200 sets the priority ranking of the failover destination server at a high ranking (S109), and waits until failover is completed (S110). In cases where the failover time has elapsed and it is judged that failover has been completed (S110: YES), the storage device 200 returns the altered priority ranking to the original state (S111).

FIG. 20 is a timing chart which shows an outline of the operation of this embodiment. At time T51, when the load of the server 110 indicated as the "server 1" exceeds a specified value L, the storage device 200 sets the priority ranking of the server 110 at a ranking that is higher than the ordinary ranking in order to handle this high load state. As a result, for example, the possibility of the system going down due to an overload of the server 110 is reduced, and the time up to the point at which the system goes down can be extended.

There may be cases in which a "link down" or the like occurs in the server 110 after the priority ranking of the server 110 has been raised. In such cases, the storage device 200 sets the priority ranking of the failover destination server 120 at a high ranking.

Thus, in the present embodiment, in cases where the server load is higher than a specified value L, the priority ranking of the server in this overload state (the future failover source server) is set at a high ranking. Furthermore, in cases where the system of this server in an overload state goes down so that failover is initiated, the priority ranking of the failover destination server is set at a high ranking.

Furthermore, the present invention is not limited to the embodiments described above; various additions, alterations and the like may be made within the scope of the present invention by a person skilled in the art. For example, respective embodiments may be appropriately combined.

What is claimed is:

1. A storage device comprising:
   first interface control parts which respectively control the exchange of data with a plurality of host devices;
   second interface control parts which respectively control the exchange of data with a plurality of storage devices;
   a memory part which is shared by said first interface control parts and said second interface control parts;
   a status detection part which respectively detects the status of said respective host devices via said first interface control parts; and
   a priority control part which respectively controls the processing priority used to process input-output requests from said respective host devices in accordance with the detected status of said respective host devices,
   wherein said respective host devices form a cluster, and said priority control part performs control so that in cases where the detected status of one of said host devices indicates that an abnormal condition has occurred, the processing priority of the host device that forms a pair with the host device in which this abnormal condition has occurred is raised.

2. The storage device according to claim 1, wherein said respective host devices form a failover cluster.

3. A storage device comprising:
   first interface control parts which respectively control the exchange of data with a plurality of host devices;
   second interface control parts which respectively control the exchange of data with a plurality of storage devices;
   a memory part which is shared by said first interface control parts and said second interface control parts;
   a status detection part which respectively detects the status of said respective host devices via said first interface control parts; and
   a priority control part which respectively controls the processing priority used to process input-output requests from said respective host devices in accordance with the detected status of said respective host devices
   wherein said respective host devices form a cluster, and said priority control part performs control so that in cases where the detected status of one of said host device indicates an overload state, the processing priority of the host device in which this overload state has occurred is raised.

4. A storage device comprising:
   first interface control parts which respectively control the exchange of data with a plurality of host devices;
   second interface control parts which respectively control the exchange of data with a plurality of storage devices;
   a memory part which is shared by said first interface control parts and said second interface control parts;
   a status detection part which respectively detects the status of said respective host devices via said first interface control parts; and
   a priority control part which respectively controls the processing priority used to process input-output requests from said respective host devices in accordance with the detected status of said respective host devices,
   wherein said respective host devices form a cluster, and said priority control part performs control so that in cases where the detected status of one of said host devices indicates an overload state, the processing priority of the host device in which this overload state has occurred is raised, and performs control so that in cases where the detected status of one of said host device indicates the occurrence of an abnormal condition, the processing priority of a host device that forms a pair with the host device in which this abnormal condition has occurred is raised.

5. A storage device comprising:
first interface control parts which respectively control the exchange of data with a plurality of host devices;
second interface control parts which respectively control the exchange of data with a plurality of storage devices;
a memory part which is shared by said first interface control parts and said second interface control parts;
a status detection part which respectively detects the status of said respective host devices via said first interface control parts; and
a priority control part which respectively controls the processing priority used to process input-output requests from said respective host devices in accordance with the detected status of said respective host devices,
wherein said respective host devices form a cluster, and in cases where a specified failure occurs in one of the host devices forming a pair, the priority control part raises the processing priority of the other host device forming said pair prior to the detection of the occurrence of failure by this other host device.

6. The storage device according to claim 5, wherein specified input-output requests that are respectively issued by the respective host devices are defined in said respective status patterns on the basis of a plurality of specified statuses in which the respective host devices can be placed, and the status detection part respectively detects the status of respective host devices by comparing the input-output requests received by the first interface control parts from the respective host devices with said specified input-output requests.

7. A storage device comprising:
first interface control parts which respectively control the exchange of data with a plurality of host devices;
second interface control parts which respectively control the exchange of data with a plurality of storage devices;
a memory part which is shared by said first interface control parts and said second interface control parts;
a status detection part which respectively detects the status of said respective host devices via said first interface control parts; and
a priority control part which respectively controls the processing priority used to process input-output requests from said respective host devices in accordance with the detected status of said respective host devices,
wherein a priority management table in which a plurality of status patterns and processing priorities for each of these status patterns are caused to correspond is stored beforehand in said memory part, and the priority control part determines the processing priority for the respective host devices by referring to the priority management table on the basis of the detected status of the respective host devices.

8. A storage device comprising:
first interface control parts which respectively control the exchange of data with a plurality of host devices;
second interface control parts which respectively control the exchange of data with a plurality of storage devices;
a memory part which is shared by said first interface control parts and said second interface control parts;
a status detection part which respectively detects the status of said respective host devices via said first interface control parts; and
a priority control part which respectively controls the processing priority used to process input-output requests from said respective host devices in accordance with the detected status of said respective host devices,
wherein said priority control part performs control so that altered processing priorities are returned to the original processing priorities when specified alteration termination conditions are met.

9. A storage device comprising:
first interface control parts which respectively control the exchange of data with a plurality of host devices;
second interface control parts which respectively control the exchange of data with a plurality of storage devices;
a memory part which is shared by said first interface control parts and said second interface control parts;
a status detection part which respectively detects the status of said respective host devices via said first interface control parts; and
a priority control part which respectively controls the processing priority used to process input-output requests from said respective host devices in accordance with the detected status of said respective host devices,
wherein said priority control part performs control so that in cases where the processing of an input-output request from one of said host devices is delayed beyond a specified value, the processing priority is raised in steps, and so that in cases where the processing of an input-output request from one of said host devices is advanced to a point in time earlier than a specified value, the processing priority is lowered in steps.

10. A storage device comprising:
channel adapters which respectively control the exchange of data with a plurality of host devices that constitute a failover cluster;
disk adapters which respectively control the exchange of data with a plurality of disk media;
a memory which is shared by said channel adapters and said disk adapters;
a priority management table which is stored in said memory, and in which specified input-output requests respectively originating in a plurality of specified statuses in which the respective host devices may be placed and processing priorities for each of these specified input-output requests are caused to correspond beforehand;
a status detection part which respectively detects whether or not said respective host devices are in said specified status by comparing the input-output requests received from said respective host devices via said channel adapters with said respective specified corresponding input-output requests in said priority management table;
a priority control part which, in cases where a host device with a specified status is detected, raises the processing priority of the host device that is set as the failover destination of this host device to a priority that is higher than the ordinary processing priority, and which lowers the processing priority of the host device that is set as the failover destination to the ordinary processing priority when failover is completed; and
an alteration instruction part which is used to alter the content of said priority management table.

* * * * *